United States Patent
Choi et al.

(10) Patent No.: US 10,930,913 B2
(45) Date of Patent: Feb. 23, 2021

(54) COMPOSITE MEMBRANE, ANODE STRUCTURE INCLUDING THE COMPOSITE MEMBRANE, LITHIUM BATTERY INCLUDING THE ANODE STRUCTURE, AND METHOD OF PREPARING THE COMPOSITE MEMBRANE

(71) Applicant: Samsung Electronics Co., Ltd., Suwon-si (KR)

(72) Inventors: Wonsung Choi, Seoul (KR); Kyounghwan Choi, Suwon-si (KR); Myungjin Lee, Seoul (KR); Toshinori Sugimoto, Hwaseong-si (KR); Shintaro Kitajima, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 208 days.

(21) Appl. No.: 16/152,948

(22) Filed: Oct. 5, 2018

(65) Prior Publication Data
US 2019/0214622 A1     Jul. 11, 2019

(30) Foreign Application Priority Data

Jan. 9, 2018  (KR) .......... 10-2018-0002989

(51) Int. Cl.
*H01M 2/16* (2006.01)
*H01M 2/14* (2006.01)
(Continued)

(52) U.S. Cl.
CPC .......... *H01M 2/166* (2013.01); *H01M 2/145* (2013.01); *H01M 2/1673* (2013.01); *H01M 4/134* (2013.01); *H01M 4/382* (2013.01); *H01M 10/0525* (2013.01); *H01M 12/08* (2013.01); *H01M 4/366* (2013.01); *H01M 10/052* (2013.01); *H01M 2004/027* (2013.01)

(58) Field of Classification Search
CPC ..... H01M 2/145; H01M 2/1673; H01M 2/166
See application file for complete search history.

(56) References Cited

U.S. PATENT DOCUMENTS 8,852,788 B2 * 10/2014 Wakizaka ........... H01M 2/1653
                                                            429/144
9,382,362 B2 *  7/2016 Abusleme ............ B01D 69/148
(Continued)

FOREIGN PATENT DOCUMENTS

JP     2008059854 A    3/2008
JP     2008117608 A    5/2008
(Continued)

OTHER PUBLICATIONS

Machine Translation of JP 5489731 (no date).*
(Continued)

*Primary Examiner* — Amanda C. Walke
(74) *Attorney, Agent, or Firm* — Cantor Colburn LLP

(57) ABSTRACT

A composite membrane comprising an organic film layer; and a plurality of ion conductive inorganic particles disposed in the organic film layer, wherein the organic film layer comprises a crosslinked copolymer, and the crosslinked copolymer comprises a fluorine-containing first repeating unit and at least one repeating unit selected from a fluorine-free second repeating unit and a fluorine-free third repeating unit.

33 Claims, 7 Drawing Sheets

(51) Int. Cl.
  *H01M 4/134* (2010.01)
  *H01M 12/08* (2006.01)
  *H01M 4/38* (2006.01)
  *H01M 10/0525* (2010.01)
  *H01M 4/36* (2006.01)
  *H01M 10/052* (2010.01)
  *H01M 4/02* (2006.01)

(56) References Cited

U.S. PATENT DOCUMENTS

| | | | |
|---|---|---|---|
| 10,256,498 B2* | 4/2019 | Abusleme | C08K 5/07 |
| 2013/0136998 A1 | 5/2013 | Hwang et al. | |
| 2015/0079485 A1* | 3/2015 | Choi | B32B 27/32 |
| | | | 429/403 |
| 2015/0228950 A1* | 8/2015 | Moon | H01M 8/188 |
| | | | 429/105 |
| 2015/0325831 A1* | 11/2015 | Dennes | H01G 11/56 |
| | | | 429/144 |
| 2016/0181585 A1* | 6/2016 | Choi | H01M 2/1686 |
| | | | 429/403 |
| 2016/0190536 A1* | 6/2016 | Park | H01M 10/0525 |
| | | | 429/144 |
| 2016/0344081 A1 | 11/2016 | Kwon et al. | |
| 2017/0093002 A1* | 3/2017 | Choi | H01M 2/145 |
| 2017/0252657 A1* | 9/2017 | Kruglick | A63F 13/216 |
| 2017/0338461 A1* | 11/2017 | Seo | C09D 5/18 |
| 2018/0040904 A1* | 2/2018 | Choi | H01M 2/1686 |
| 2018/0123116 A1 | 5/2018 | Lee et al. | |
| 2018/0254449 A1* | 9/2018 | Xiao | H01M 2/1646 |
| 2018/0301777 A1 | 10/2018 | Kim et al. | |
| 2018/0331367 A1 | 11/2018 | Kim et al. | |
| 2018/0351202 A1 | 12/2018 | Choi et al. | |
| 2019/0036127 A1 | 1/2019 | Park et al. | |
| 2019/0036186 A1 | 1/2019 | Kim et al. | |
| 2019/0097289 A1 | 3/2019 | Lee et al. | |
| 2019/0194373 A1* | 6/2019 | Ma | C08F 220/28 |
| 2019/0207190 A1* | 7/2019 | Hu | H01M 2/1653 |
| 2019/0229318 A1* | 7/2019 | Xiao | H01M 4/133 |
| 2019/0273238 A1* | 9/2019 | Mizuno | H01M 10/04 |

FOREIGN PATENT DOCUMENTS

| | | | |
|---|---|---|---|
| JP | 2009059604 A | 3/2009 | |
| JP | 5489731 B2 | 5/2014 | |
| KR | 20150031377 A | 3/2015 | |
| KR | 20160075292 A | 6/2016 | |
| KR | 20160136911 A | 11/2016 | |
| KR | 20170037495 A | 4/2017 | |
| WO | WO-2010076661 A1 * | 7/2010 | B01D 71/64 |

OTHER PUBLICATIONS

Extended European search report issued by the European Patent Office dated Feb. 15, 2019 in the examination of the European Patent Application No. 18210025.5, which corresponds to above U.S. Appl. No. 16/152,948.
Li Xiong et al., "Spray-Deposition and Photopolymerization of Organic-Inorganic Thiol-ene Resins for Fabrication of Superamphiphobic Surfaces", Applied Materials & Interfaces, Jun. 9, 2014, pp. 10763-10774, vol. 6, Issue 13.
Luke Kwisnek, "Photopolymerized Thiol-ene Networks for Gas Barrier and Membrane Applications", The University of Southern Mississippi, The Aquila Digital Community, May 2011, Dissertations. 670., pp. 1-198, https://aquila.usm.edu/dissertations/670.
Yinyong Li et al. "Scaling Up Nature: Large Area Flexible Biomimetic Surfaces", Applied Materials & Interfaces, Oct. 1, 2018, pp. 23439-23444, vol. 7.

* cited by examiner

COMPOSITE MEMBRANE, ANODE STRUCTURE INCLUDING THE COMPOSITE MEMBRANE, LITHIUM BATTERY INCLUDING THE ANODE STRUCTURE, AND METHOD OF PREPARING THE COMPOSITE MEMBRANE

CROSS-REFERENCE TO RELATED APPLICATION

This application claims the benefit of and priority to Korean Patent Application No. 10-2018-0002989, filed on Jan. 9, 2018, in the Korean Intellectual Property Office, and all the benefits accruing therefrom under 35 U.S.C. § 119, the disclosure of which is incorporated herein in its entirety by reference.

BACKGROUND

1. Field

The present disclosure relates to a composite membrane, an anode structure including the composite membrane, a lithium battery including the composite membrane, and a method of preparing the composite membrane.

2. Description of the Related Art

A lithium air battery includes an anode that enables intercalation/deintercalation of lithium ions, a cathode where oxygen in the air is used as a cathode active material and includes a catalyst for the oxidation and reduction of oxygen, and lithium ion conductive media between the cathode and the anode.

Lithium air batteries have a theoretical energy density of 3,000 watt hours per kilogram (Wh/kg) or greater, which is much greater than that of lithium ion batteries. In addition, lithium air batteries are more environmentally friendly and are more stable than lithium ion batteries.

To improve the cell performance of these lithium air batteries, there is a need to provide an improved separator which blocks moisture and gas, allows lithium ions to pass there through, and is prevented from swelling caused by an electrolyte.

SUMMARY

Provided are composite membranes.

Provided are anode structures including the composite membranes.

Provided are lithium batteries including the anodes.

Provided are methods of preparing composite membranes.

Additional aspects will be set forth in part in the description which follows and, in part, will be apparent from the description, or may be learned by practice of the presented embodiments.

According to an aspect, a composite membrane includes an organic film layer; and a plurality of ion conductive inorganic particles disposed in the organic film layer, wherein the organic film includes a crosslinked copolymer, and the cross-linked copolymer includes a fluorine-containing first repeating unit, and at least one repeating unit selected from a fluorine-free second repeating unit and a fluorine-free third repeating unit.

According to another aspect, an anode structure includes an anode and the composite membrane.

According to still another aspect, a lithium battery includes the anode structure.

According to yet another aspect, a method of preparing a composite membrane includes: placing a plurality of ion conductive inorganic particles on a substrate; disposing, among the plurality of ion conductive inorganic particles, a mixture including a polymerizable composition and a solvent; removing the solvent from the mixture; and polymerizing the polymerizable composition to form the composite membrane comprising an organic film layer and a plurality of ion conductive inorganic particles disposed in the organic film layer, wherein the polymerizable composition comprises a polymerizable fluoro-containing monomer and a polymerizable fluorine-free monomer, and the organic film layer comprises a crosslinked copolymer.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
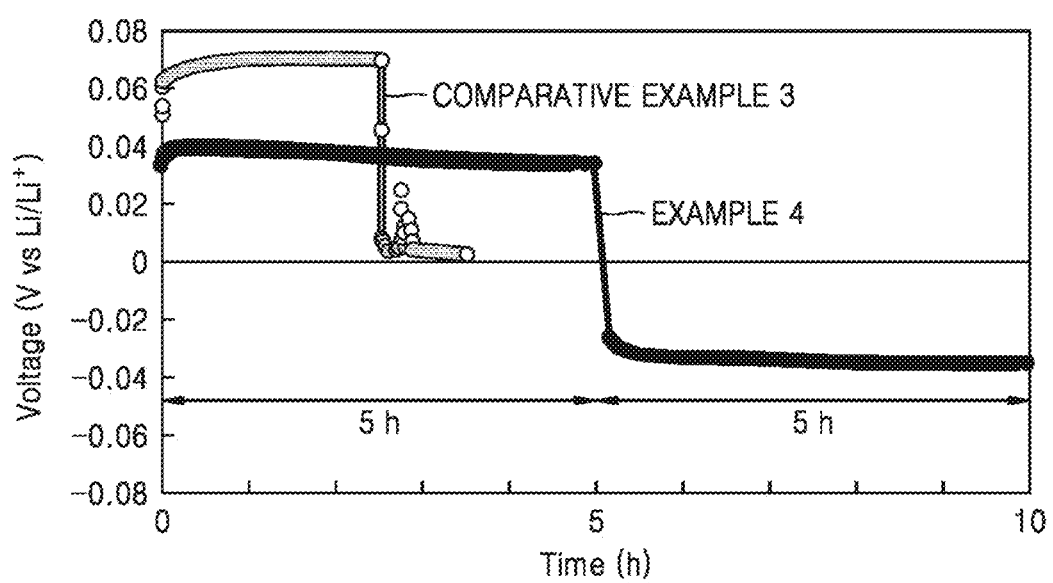
FIG. 1 is a graph of voltage (volts, V) versus time (hour, h) showing the results of charging/discharging stability evaluation of composite membranes prepared according to Example 4 and Comparative Example 3.

Reference will now be made in detail to one or more embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

The present disclosure described below may be transformed in various manners. Accordingly, particular embodiments are illustrated in the drawings and described in detail in the description. However, this is not intended to limit the disclosure to particular modes of practice, and it is to be appreciated that all changes, equivalents, and substitutes that do not depart from the spirit and technical scope are encompassed in the present disclosure.

It is to be understood that the terms used herein is for the purpose of describing particular examples only and is not intended to limit the scope of the disclosure. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. The expression "/" used below may be interpreted as "and" or "or".

In the drawings, to clearly illustrate elements, layers and regions, diameters, lengths, and thicknesses are enlarged or shrunk in size. Like components are designated with like reference numerals throughout the specification. It will be understood that when a component, such as a layer, a film, a region, or a plate, is referred to as being "on" another component, the component may be directly on the other component or intervening components may be present thereon. In contrast, when an element is referred to as being "directly on" another element, there are no intervening elements present. While such terms as "first," "second," etc., may be used to describe various elements, components, regions, layers, and/or sections, such elements, components, regions, layers, and/or sections should not be limited by these terms. These terms are used only to distinguish one element, component, region, layer, or section from another element, component, region, layer, or section. Thus, "a first element," "component," "region," "layer," or "section" discussed below could be termed a second element, component, region, layer, or section without departing from the teachings herein. In the drawings, some components may be omitted. However, the omission is to help understanding of the disclosure and is not intended to exclude the omitted components.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a composite membrane according to one or more exemplary embodiments, an anode structure including the same according to one or more exemplary embodiments, a lithium battery including the composite membrane according to one or more exemplary embodiments, and a method of manufacturing a composite membrane according to one or more exemplary embodiments will be described in detail.

A composite membrane according to an embodiment includes an organic film layer; and a plurality of ion conductive inorganic particles disposed in the organic film layer, wherein the organic film layer includes a crosslinked copolymer, and the crosslinked copolymer includes a fluorine-containing first repeating unit; and at least one repeating unit selected from a fluorine-free second repeating unit and a fluorine-free third repeating unit.

Since the crosslinked copolymer includes the fluorine-containing first repeating unit, the swelling of the organic film due to an electrolyte may be suppressed. Therefore, even after a lithium battery including an electrolyte is charged and discharged for a long period of time, cracks and fractures of a composite membrane including an organic film may be suppressed.

Since the crosslinked copolymer includes at least one repeating unit selected from a fluorine-free second repeating unit and a fluorine-free third repeating unit, the organic film including the crosslinked copolymer may prevent permeation of moisture or gas, such as, oxygen or carbon dioxide. Accordingly, in the case of a lithium battery including the composite membrane including the organic film, even after the long period of charging and discharging, the deterioration of a lithium anode due to moisture and gas is effectively suppressed by the composite membrane.

Since the composite membrane includes ion conductive inorganic particles, ions, such as lithium ions, may be transferred or transported across the composite membrane. Therefore, the resistance of the composite membrane may be very low.

The composite membrane provides excellent ionic conductivity, excellent gas and moisture blocking properties, and improved durability obtained by suppressing the swelling due to the electrolyte. Accordingly, charging/discharging characteristics of a lithium battery including the composite membrane may be improved.

In an example of the composite membrane, the fluorine-containing first repeating unit included in the crosslinked copolymer may be represented by one or more of Formulae 1 to 3:

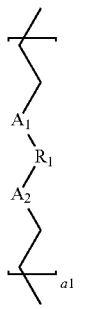

Formula 1

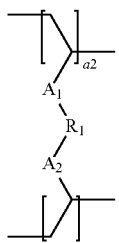

Formula 2

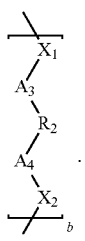

Formula 3

In Formulae 1 to 3, $A_1$, $A_2$, $A_3$, and $A_4$ may each independently be a covalent bond, —C(=O)—O—, —C(=O)—, or a $C_1$ to $C_5$ linear or branched alkylene group, $R_1$ and $R_2$ may each independently be a $C_1$ to $C_{10}$ linear or branched alkylene group; -(—$R_a$—O—)$_k$— wherein k is an integer from 2 to 100 and $R_a$ may be a $C_2$ to $C_{10}$ alkylene group; a $C_6$ to $C_{10}$ cycloalkylene group; a $C_6$ to $C_{10}$ arylene group; or a $C_2$ to $C_{10}$ heteroarylene group, $R_1$ and $R_2$ may each be substituted with at least one fluorine atom, $X_1$ and $X_2$ may each independently be a covalent bond, —NH—C(=O)—, —CH$_2$CH(OH)—, —CF$_2$CF(OH)—, —O—, or —S—, and a1, a2, and b are each a mole fraction and satisfy the conditions of 0≤a1<1, 0≤a2<1, 0≤b<1, and 0<a1+a2+b<1. For example, when the fluorine-containing first repeating unit includes units of both Formula 1 and Formula 2, a condition satisfied includes 0<a1+a2<1, because b=0.

The fluorine-containing first repeating unit in the cross-linked copolymer refers to a cross-linked first repeating unit connected to a plurality of other polymer chains. Since the cross-linked first repeating unit includes at least one fluorine atom, the swelling of the crosslinked copolymer with respect to an electrolyte may be suppressed. When the amount of the fluorine atom included in the cross-linked first repeating unit is increased, the swelling of the crosslinked copolymer with respect to an electrolyte is more effectively suppressed.

In an example of the composite membrane, the fluorine-free second repeating unit included in the crosslinked copolymer may be represented by one or more of Formulae 4 to 7:

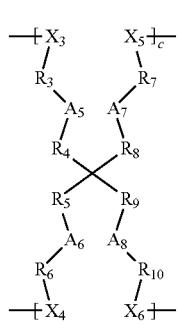

Formula 4

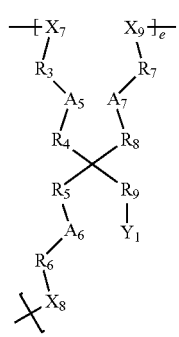

Formula 5

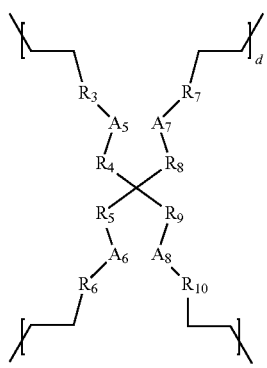

Formula 6

Formula 7

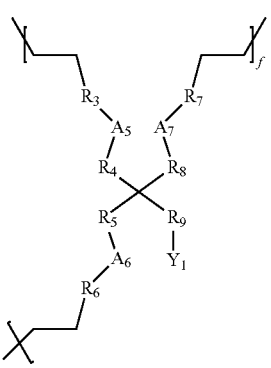

In Formulae 4 to 7, $A_5$, $A_6$, $A_7$, and $A_8$ may each independently be a covalent bond, —C(=O)—O—, —C(=O)—, or a $C_1$ to $C_5$ linear or branched alkylene group, $R_3$, $R_4$, $R_5$, $R_6$, $R_7$, $R_8$, $R_9$, and $R_{10}$ may each independently be a $C_1$ to $C_{10}$ linear or branched alkylene group; -($R_a$—O—$)_k$— wherein k is an integer from 2 to 100 and $R_a$ is a $C_2$ to $C_{10}$ alkylene group; a $C_6$ to $C_{10}$ cycloalkylene group; a $C_6$ to $C_{10}$ arylene group; or a $C_2$ to $C_{10}$ heteroarylene group, $Y_1$ is a hydrogen atom, —OH, or —SH, $X_3$, $X_4$, $X_5$, $X_6$, $X_7$, $X_8$, and $X_9$ may each independently be a covalent bond, —NH—C(=O)—, —CH$_2$CH(OH)—, —CF$_2$CF(OH)—, —O—, or —S—, and c, d, e, and f are each a mole fraction and satisfy the conditions of $0 \le c<1$, $0 \le d<1$, $0 \le e<1$, $0 \le f<1$, and $0<c+d+e+f<1$.

The fluorine-free second repeating unit in the crosslinked copolymer refers to a cross-linked fluorine-free second repeating unit connected to three or more polymer chains. The cross-linked fluorine-free second repeating unit may contribute to an improvement of moisture and gas blocking properties of the crosslinked copolymer.

In an example of the composite membrane, the fluorine-free third repeating unit included in the crosslinked copolymer may be represented by one or more of Formulae 8 to 13:

Formula 8

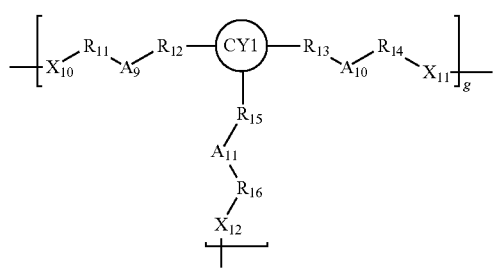

Formula 9

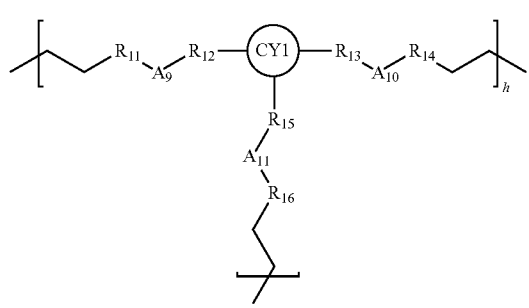

Formula 10

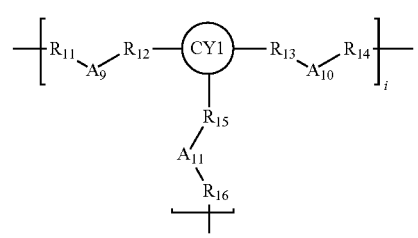

Formula 11

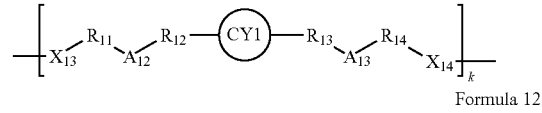

Formula 12

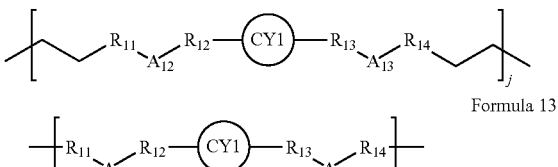

Formula 13

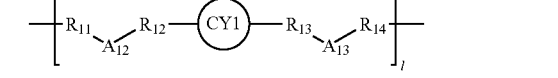

In Formulae 8 to 13, $A_9$, $A_{10}$, $A_{11}$, $A_{12}$, and $A_{13}$ may each independently be a covalent bond, —O—, —C(=O)—O—, —C(=O)—, or a C1 to C5 linear or branched alkylene group, $R_{11}$, $R_{12}$, $R_{13}$, and $R_{14}$ may each independently be a covalent bond, a C1 to C10 linear or branched alkylene group; -($R_a$—O—$)_k$— wherein k is an integer from 2 to 100 and $R_a$ is a C2 to C10 alkylene group; a C6 to C10 cycloalkylene group; a C6 to C10 arylene group; or a C2 to C10 heteroarylene group, CY1 may be a C2 to C20 heterocycloalkylene group; a C5 to C20 cycloalkylene group; a C6 to C20 arylene group; or a C2 to C20 heteroarylene group, $X_{10}$, $X_{11}$, $X_{12}$, $X_{13}$, and $X_{14}$ may each independently be a covalent bond, —NH—C(=O)—, —CH$_2$CH(OH)—, —CF$_2$CF(OH)—, —O—, or —S—, and g, h, i, j, k, and l are each a mole fraction and satisfy the conditions of $0 \le g<1$, $0 \le h<1$, $0 \le i<1$, $0 \le j<1$, $0 \le k<1$, $0 \le l<1$, and $0<g+h+i+j+k+l<1$.

The fluorine-free third repeating unit in the crosslinked copolymer refers to a cross-linked fluorine-free third repeating unit connected to three or more polymer chains.

The cross-linked fluorine-free third repeating unit may contribute to an improvement of moisture and gas blocking properties of the crosslinked copolymer.

In an example of the composite membrane, the cross-linked copolymer includes a first repeating unit, a second repeating unit, and a third repeating unit, and a1, a2, b, c, d, e, f, g, h, i, j, k, and l respectively are each mole fractions and satisfy the conditions of $0 \le a1<1$, $0 \le a2<1$, $0 \le b<1$, $0 \le c<1$, $0 \le d<1$, $0 \le e<1$, $0 \le f<1$, $0 \le g<1$, $0 \le h<1$, $0 \le i<1$, $0 \le j<1$, $0 \le k<1$, and $0 \le l<1$, and further satisfy the conditions of $a1+a2+b+c+d+e+f+g+h+i+j+k+l=1$, $0<a1+a2+b<0.5$, $0.1<c+d+e+f<1$, and $0.1<g+h+i+j+k+l<1$.

In an example of the composite membrane, CY1 included in the crosslinked copolymer may be represented by one of Formulae 14 to 17:

Formula 14

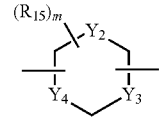

-continued

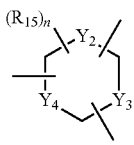
Formula 15

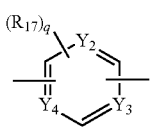
Formula 16

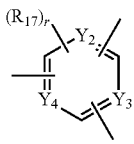
Formula 17

In Formulae 14 to 17, each $R_{15}$ is the same or different, and independently may be a hydrogen atom or a C1 to C10 linear or branched alkyl group, each $R_{27}$ is the same or different, and independently may be a hydrogen atom or a C1 to C10 linear or branched alkyl group, $Y_2$, $Y_3$, and $Y_4$ may each independently be C, N, or P, with the proviso that when $Y_2$, $Y_3$, and $Y_4$ are each independently N or P, $Y_2$, $Y_3$, and $Y_4$ are not connected to $R_{15}$, $R_{27}$, or another linking group, m is 0 to 10, n is 0 to 9, q is 0 to 4, and r is 0 to 3.

In the crosslinked copolymer included in an embodiment of the composite membrane, the amount of the fluorine-containing first repeating unit may be, based on the total weight of the crosslinked copolymer, in the range of about 1 weight percent (wt %) to about 50 wt %, about 1 wt % to about 45 wt %, about 1 wt % to about 40 wt %, or about 1 wt % to about 35 wt %, and the sum of the fluorine-free second repeating unit and the fluorine-free third repeating unit may be, based on the total weight of the crosslinked copolymer, in the range of about 50 wt % to about 99 wt %, about 55 wt % to about 99 wt %, about 60 wt % to about 99 wt %, or about 65 wt % to about 99 wt %.

In an example of the composite membrane, the crosslinked copolymer may include, for example, i) a polymerization product of a polymerizable fluoro-containing monomer and a polymerizable fluorine-free monomer or ii) a polymerization product of a polymerizable fluoro-containing monomer, a polymerizable fluorine-free monomer, and a polythiol compound having three or four thiol groups.

Based on the total weight of the polymerizable compound, an amount of the polymerizable fluoro-containing monomer may be, for example, in the range of about 1 wt % to about 50 wt %, about 1 wt % to about 45 wt %, about 1 wt % to about 40 wt %, or about 1 wt % to about 35 wt %, and an amount of the polymerizable fluorine-free monomer or the sum of the polymerizable fluorine-free monomer and the polythiol compound may be, for example, based on the total weight of the polymerizable compound, in the range of about 50 wt % to about 99 wt %, about 55 wt % to about 99 wt %, about 60 wt % to about 99 wt %, or about 65 wt % to about 99 wt %. The weight ratio of the polymerizable fluorine-free monomer to the polythiol compound may be in the range of 1:9 to 9:1, or 2:8 to 8:2, 3:7 to 7:3, or 4:6 to 6:4.

The polymerizable fluoro-containing monomer is a polymerizable organic monomer including at least one fluorine atom, and is a compound including two or more polymerizable functional groups. In other words, the polymerizable fluoro-containing monomer is polyfunctional. The polymerization used herein refers to copolymerization and crosslinking. For example, the fluoro-containing monomer can be a divalent or trivalent monomer.

The polymerizable fluorine-free monomer is a polymerizable organic monomer that does not include any fluorine atoms, and is a compound including two or more polymerizable functional groups. In other words, the polymerizable fluorine-free monomer is polyfunctional. For example, the fluorine-free monomer can be a divalent or trivalent monomer.

An example of the polymerizable fluoro-containing compound and/or the polymerizable fluorine-free compound is a water-insoluble floating compound. The polymerizable water-insoluble floating compound is a polymerizable organic monomer that floats in water and is non-volatile and water-insoluble, and is a compound having two or more polymerizable functional groups. The water-insoluble floating compound refers to a hydrophobic compound.

In an example of the composite membrane, the crosslinked copolymer may include, for example, i) a polymerization product of at least one fluorine-free monomer selected from a acrylic monomer, a vinyl monomer, and a isocyanate monomer, and at least one fluoro-containing monomer selected from a fluoro-containing acrylic monomer, a fluoro-containing vinyl monomer, a fluoro-containing isocyanate monomer, and a fluoro-containing epoxide monomer, or ii) a polymerization product of a polythiol compound having three or four thiol groups, at least one fluorine-free monomer selected from a acrylic monomer, a vinyl monomer, and a isocyanate monomer, and at least one fluoro-containing monomer selected from a polyfunctional fluoro-containing acrylic monomer, a polyfunctional fluoro-containing vinyl monomer, a fluoro-containing isocyanate monomer, and a fluoro-containing epoxide monomer.

In the polymerization product, based on the total weight of the polymerizable composition, an amount of the fluoro-containing monomer may be, for example, in the range of about 1 wt % to about 50 wt %, about 1 wt % to about 45 wt %, about 1 wt % to about 40 wt %, or about 1 wt % to about 35 wt %, and the combined amount of the at least one fluorine-free monomer and the polythiol compound may be, for example in the range of about 50 wt % to about 99 wt %, about 55 wt % to about 99 wt %, about 60 wt % to about 99 wt %, or about 65 wt % to about 99 wt %. The weight ratio of the fluorine-free monomer(s) to the polythiol compound may be in the range of 1:9 to 9:1, or 2:8 to 8:2, 3:7 to 7:3, or 4:6 to 6:4.

The term "polyfunctional" used herein refers to having two or more polymerizable functional groups.

In an example of the composite membrane, the fluoro-containing monomer used in the polymerizing reaction to form the crosslinked copolymer may be represented by one or more of Formulae 14 to 18:

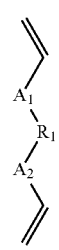
Formula 14

Formula 15

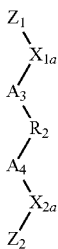

Formula 16

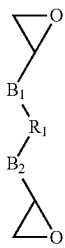

Formula 17

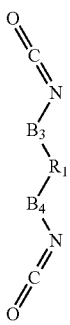

Formula 18

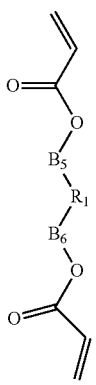

In Formulae 14 to 18, $A_1$, $A_2$, $A_3$, and $A_4$ may each independently a covalent bond, —C(=O)—O—, —C(=O)—, or a C1 to C5 linear or branched alkylene group, $B_1$, $B_2$, $B_3$, and $B_4$ may each independently a covalent bond, or a C1 to C5a linear or branched alkylene group, $R_1$ and $R_2$ may each independently be a C1 to C10 linear or branched alkylene group; or -(—$R_a$—O—)$_k$— wherein k is an integer from 2 to 100 and $R_a$ may be a C2 to C10 alkylene group; a C6 to C10 cycloalkylene group; a C6 to C10 arylene group; or a C2 to C10 heteroarylene group, each of $R_1$ and $R_2$ includes at least one fluorine atom, $X_{1a}$ and $X_{2a}$ may each independently be —O— or —S—, and $Z_1$ and $Z_2$ may each independently be a hydrogen atom, a C1 to C5 alkyl group or a C1 to C5 fluoroalkyl group.

The fluorine-free monomer may include, for example, at least one selected from diurethane dimethacrylate, trimethylolpropane triacrylate, diurethane diacrylate, trimethylolpropane trimethacrylate, neopentyl glycol diacrylate, 3'-acryloxy-2',2'-dimethylpropyl 3-acryloxy-2,2-dimethylpropionate, bisphenol A diacrylate, 1,3,5-triallyl-1,3,5-triazine-2,4,6-trione, 2,4,6-tris(allyloxy)-1,3,5-triazine, pentaerythrithol allyl ether, and isophorone diisocyanate, but is not limited thereto. Any suitable polyfunctional fluorine-free monomer, including one that is used in the art, may be used for the polyfunctional fluorine-free monomer herein.

The polythiol compound may include, for example, at least one selected from tris(2-(3-mercaptopropionyloxy) ethyl) isocyanurate, pentaerythritol tetrakis(3-mercaptopropionate), trimethylolpropane tris(3-mercaptopropionate), 4-mercaptomethyl-3,6-dithia-1,8-octanedithiol, pentaerythritol tetrakis(2-mercaptoacetate), and trimethylolpropane tris (2-mercaptoacetate), but is not limited thereto. Any suitable polythiol compound, including one that is used in the art, may be used for the polythiol herein.

The fluoro-containing monomer may include, for example, at least one selected from 2,2,3,3,4,4,5,5-octafluorohexane-1,6-diyldiacrylate, 2,2'-(3,3,4,4,5,5,6,6-decafluorohepane-1,7-diyl)bis(oxirane), and a methacryloyl group-containing fluoropolyether (e.g., FOMBLIN MT70), but is not limited thereto. Any suitable polyfunctional fluoro-containing monomer, including one that is used in the art, may be used for the polyfunctional fluoro-containing monomer herein.

The polymerizable water-insoluble floating compound has a solubility with respect to water of about 0.0001 grams per liter (g/l) to about 0.025 g/l. When the polymerizable water-insoluble floating compound is pentaerythritol tetrakis (3-mercaptopropionate), the solubility of pentaerythritol tetrakis(3-mercaptopropionate) with respect to water is about 0.00369 g/l; when the polymerizable water-insoluble floating compound is 1,3,5-triallyl-1,3,5-triazine-2,4,6-trione (TTT), the solubility of TTT with respect to water is 0.001 g/l; and when the polymerizable water-insoluble floating compound is trimethylolpropane trimethacrylate, the solubility of trimethylolpropane trimethacrylate with respect to water is about 0.0201 g/l.

In an example of the composite membrane, since the crosslinked copolymer has barrier properties of blocking at least one of oxygen and moisture, the organic film layer has barrier properties of blocking, for example, anode corrosive gases. The anode corrosive gases are, for example, water vapor, carbon dioxide, and oxygen. Such an organic film layer functions as an oxygen barrier membrane, a moisture blocking membrane, or a carbon dioxide barrier membrane. As a result, a composite membrane containing the organic film layer has moisture and gas blocking properties.

In an example of the composite membrane, the gas permeability of the organic film layer may be in the range of about $10^{-3}$ to about 2,000 cubic centimeters per centimeter per meter squared per day per atmosphere ($cm^3$ $cm/m^2$ day atm). The gas permeability may be determined at standard temperature and pressure and reported using the corresponding units of cubic centimeters at standard temperature and pressure per centimeter per meter squared per day per atmosphere ($cm^3$ (STP) $cm/m^2 \cdot day \cdot atm$). The term "gas" used herein refers to including of oxygen, carbon dioxide, and moisture. Gas permeability refers to, for example, oxygen permeability and/or moisture permeability.

In an example of the composite membrane, the organic film layer may be a foldable and flexible membrane. Due to the flexibility of the organic film layer, a composite membrane containing the organic film layer may be applied to a folding cell.

In an example of the composite membrane, the tensile strength of the organic film layer may be about 10 megapascals (MPa) or greater, about 15 MPa or greater, about 20 MPa or greater, about 25 MPa or greater, about 30 MPa or greater, about 35 MPa or greater, about 40 MPa or greater, or about 45 MPa or greater. Since the organic film layer has an increased tensile strength, the organic film may provide excellent mechanical properties. The yield strain (i.e., strain at yield point) of the organic film layer may be about 1% or greater, about 1.5% or greater, about 2% or greater, or about 2.5% or greater. Since the organic film layer has an increased yield strain, the organic film layer has flexibility and is bendable or foldable. Accordingly, the organic film layer may be applicable for various purposes.

In an example of the composite membrane, the swelling ratio of the organic film layer after being impregnated in an electrolytic solution at the temperature of 80° C. for 24 hours is about 30% or less, about 25% or less, about 20% or less, about 15% or less, about 10% or less, or about 5% or less. The swelling ratio is calculated according to Equation 1.

Swelling ratio(%)=[((weight of organic film after the impregnation)−(weight of organic film before the impregnation))/(weight of organic film before the impregnation)]×100%  Equation 1

Since the organic film layer has a low swelling ratio with respect to the electrolytic solution, even when a composite membrane including the organic film layer contacts the electrolytic solution for a long period of time, the deterioration of the composite membrane caused by swelling, for example, cracking may be suppressed. For example, even when a lithium battery including the composite membrane is charged or discharged for a long period of time, cracks of the composite membrane may be prevented.

Figure 4A:
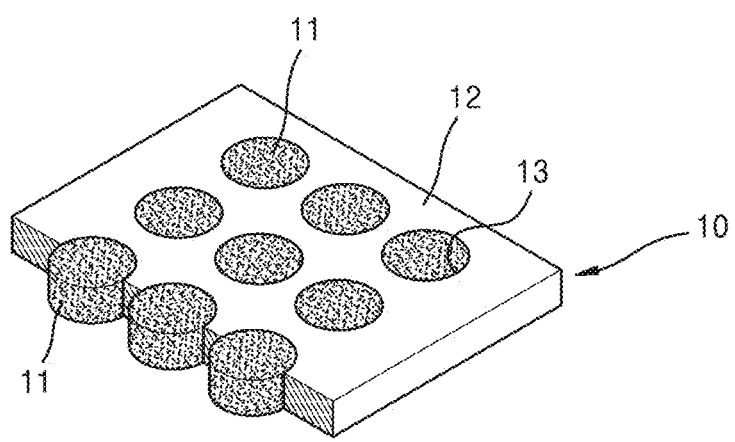
FIGS. 4A and 4B show schematic views of a composite membrane according to an embodiment.
Figure 4B:
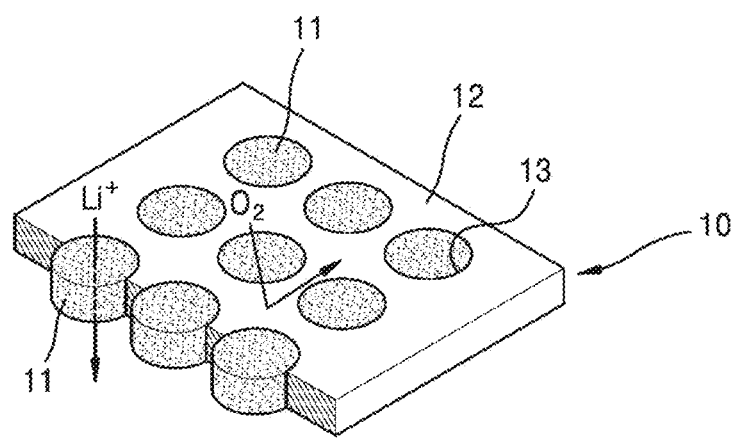

Referring to FIGS. 4A and 4B, composite membrane 10 has a structure in which a plurality of ion conductive inorganic particles 11 are disposed in or penetrate the organic film layer 12. "Penetrate" as used herein means that at least some portion of the particle is exposed on a surface of the composite membrane. In an example of the composite membrane, the organic film layer has a plurality of through-holes, and a plurality of ion conductive inorganic particles are disposed in the plurality through-holes.

Referring to FIGS. 4A and 4B, a composite membrane 10 includes an organic film layer 12 having a plurality of through-holes 13 and a plurality of ion conductive inorganic particles 11 disposed or placed in the plurality of through-holes 13. The ion conductive inorganic particles 11 may pass through the organic film layer 12, and are exposed to opposite sides of the composite membrane 10. The sizes of the through-holes 13 are controlled according to the sizes of the ion conductive inorganic particles 11, in the manufacturing process of the composite membrane. As described above, since the organic film layer 12 has a crosslinked copolymer, at least one of oxygen and moisture may be blocked. The ion conductive inorganic particles 11 exposed to opposite sides of the composite membrane 10 enable transferring of ions, for example, lithium ions. That is, since the organic film layer 12 blocks oxygen and/or moisture and the ion conductive inorganic particles 11 enables the transfer of ions to occur, the composite membrane 10 is an optional permeable membrane. In an embodiment, the ion conductive inorganic particles 11 are exposed to the surface (or on the surface) of the composite membrane 10. The total exposure surface area of the ion conductive inorganic particles 11 may be, for example, in the range of about 30% to about 80%, for example, about 40% to about 70%, based on the total surface area of the composite membrane 10. When the total exposure surface area of the plurality of ion conductive inorganic particles 11 are within these ranges, the ion conductivity of the composite membrane 10 may be further improved. In the composite membrane 10, the "thickness" of each of the ion conductive inorganic particles 11 refers to a dimension between the top and bottom surfaces of the corresponding ion conductive inorganic particle, independently from the shape of the corresponding ion conductive inorganic particle. In an embodiment, the thicknesses of the ion conductive inorganic particles 11 are each identical to that of the organic film layer 12. As such, when the thicknesses of the ion conductive inorganic particles 11 are identical to the thickness of the organic film layer 12, the composite membrane 10 may be more easily bonded to other components with stronger binding force. In another embodiment, the thicknesses of the ion conductive inorganic particles 11 may be different from the thickness of the organic film layer 12. In one embodiment, the thickness of the organic film layer 12 may be about 90 mm, and the thickness of ion conductive inorganic particles 11 may be about 95 mm.

Referring to FIGS. 4A and 4B, the surface of the composite membrane 10 may have, for example, a sea-island structure having ion conductive inorganic particles 11 that are discontinuously arranged in a continuous organic film layer 12. The cross section of the composite membrane 10 may have, for example, an alternately aligned structure, wherein an organic film and an ion conductive inorganic particle are alternately aligned.

Referring to FIGS. 4A and 4B, in an example of the composite membrane 10, the ion conductive inorganic particles 11 embedded in the organic film layer 12 may be a monolayer. Since the ion conductive inorganic particles 11 are in the monolayer (as opposed to being on the layer of a surface), the thickness of the organic film layer 12 may be decreased.

Referring to FIGS. 4A and 4B, in an embodiment, the ion conductive inorganic particles 11 may have the form a single-body particle that does not have an intermolecular boundary. In other words, the ion conductive inorganic particles 11 may not have a grain boundary. The organic film layer 12 may be a dense film with non-porous properties. In an example of the composite membrane 10, the organic film layer 12 may further include, in addition to the crosslinked copolymer, at least one selected from a homopolymer, a block copolymer, and a random copolymer.

Referring to FIGS. 4A and 4B, the ion conductive inorganic particles 11 may form an ion conductive region(s) and the organic film layer 12 may form a non-ion conductive region(s). The ion conductive region and the non-ion conductive region are arranged in such a way that the ion conductive region contacts the non-ion conductive region in a film width direction (X-axis direction), thereby providing a bicontinuous structure in a film thickness direction (Y-axis direction). The term "bicontinuous structure" used herein refers to a structure in which one or more ion conductive inorganic particles, which form the ion conductive region, contact one or more non-ion conductive regions of the organic film, and thus, the ion conductive inorganic particles and the organic film layer, each independently, continuously connect opposite surfaces of the composite membrane 10 in a film thickness direction (i.e. Y-axis direction).

In an embodiment, a hydrophobic coating film (not shown) may be formed on at least a portion of the surfaces of the ion conductive inorganic particles 11. That is, the ion conductive inorganic particles 11 may be hydrophobized particles. A hydrophobic coating film may be a continuous coating film or a discontinuous coating film, such as an island. Since the hydrophobic coating film is introduced to at least a portion of the surfaces of the ion conductive inorganic particles, the buoyancy of the ion conductive inorganic particles in water may be controllable.

Figure 5:
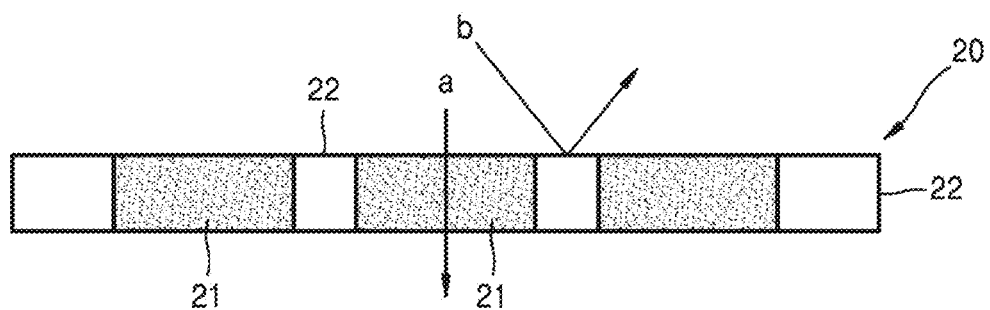
FIG. 5 is a cross-sectional view of a composite membrane according to an embodiment.

FIG. 5 shows a cross section of the composite membrane 10 shown in FIGS. 4A and 4B. Referring to FIG. 5, when a composite membrane 20 is used as an oxygen-permeation blocking film of a lithium air battery, an ion (for example: a lithium ion) may pass through a ion conductive region including a ion conductive inorganic particle 21, as indicated as "a", and gas, such as oxygen, or moisture may be blocked by an organic film layer 22, as indicated as "b". The organic film layer 22 may include the crosslinked copolymer as described above.

An example of the composite membrane may be used as a gas-permeation blocking film for a lithium air battery, and an anode protective film for a lithium battery.

The shapes of ion conductive inorganic particles are not limited to the shapes illustrated in FIGS. 4A, 4B, and 5.

The ion conductive inorganic particles may each have, for example, a vertical cross-sectional shape and/or horizontal cross-sectional shape that are the same or different, such as a circular shape, a triangular shape, a quasi-triangular shape, a triangular shape with semi-circle, a triangular shape with one or more rounded corners, a square shape, a rectangular shape, a rectangular shape with semi-circles, or a polygonal shape. The ion conductive inorganic particles may have various shapes, such as a cubic shape, a spherical shape, a circular shape, an oval shape, a stick shape, a tetrahedral shape, a pyramid shape, an octahedral shape, a cylinder shape, a polygonal pillar shape, a polygonal pillar-like shape, a conical shape, an columnar shape, a tubular shape, a helical shape, a funnel shape, a dendritic shape, or a rod shape.

Regarding the sizes of ion conductive inorganic particles, when the ion conductive inorganic particles are spherical, the sizes refer to an average diameter of the sphere. When ion conductive inorganic particles have other shapes, the sizes refers to a length of a longest axis.

Referring to FIGS. 4A, 4B, and 5, the ion conductive inorganic particles 11 and 21 penetrate both surfaces of the organic film layers 12 and 22 and pass through from a top surface to a bottom surface of each of the organic film layers 12 and 22. Accordingly, the ion conductive inorganic particles are exposed to opposite surfaces of the composite membranes 10 and 20. As described above, due to the exposed surfaces of the ion conductive inorganic particles 11 on both sides of the composite membranes 10 and 20, the flow path of lithium ions is provided, leading to an improvement in conductivity of a composite membrane. This is in contrast to the case of a lithium air battery that uses a ceramic film to obtain an ion conducting function and an oxygen blocking function. Such a ceramic film is heavy, and it is difficult to manufacture a large-size ceramic film. In addition, there is a limitation in forming a film. Also, the ceramic film is likely to crack when an external force is applied thereto. That is, the ceramic film has a small mechanical strength, e.g., a fragile property. On the other hand, compared to the ceramic film, the composite membrane described herein may be embodied as a thin film layer, leading to a decrease in resistance. Also, the composite membrane is light-weight and is appropriate for being formed as a large-size film. In addition, since the composite membrane has flexibility, the composite membrane may be processed into various shapes. Accordingly, the degree of freedom for cell design is high. Also, the composite membrane has high mechanical strength.

An example of the composite membrane blocks moisture and gas, such as oxygen or carbon dioxide, and includes the crosslinked copolymer, of which a swelling ratio with respect to an electrolytic solution is suppressed. Accordingly, the composite membrane is excellent in terms of blocking moisture and gas and suppressing impregnation with respect to an electrolyte. The composite membrane may be manufactured at a lower cost than ceramic membranes according to the related art. Also, by using such a composite membrane, a lithium battery may be embodied as a large-size and light-weight film without difficulties. A lithium battery including the composite membrane may have a longer lifespan.

The composite membrane may have an ion conductive region and a non-ion conductive region, the ion conductive region and the non-ion conductive region are arranged to be in contact with each other in a film width direction (the X-axis direction) to form a bicontinuous structure, and the ion conductive region includes ion conductive inorganic particles, and the non-ion conductive region includes the crosslinked copolymer. The ion conductive inorganic particles may have the shape of a single-body particle or single particles that lack a grain boundary. Ion conductive inorganic particles are exposed to the surface of the composite membrane. Accordingly, while retaining ion conductivity, the composite membrane has high flexibility and excellent mechanical strength and thus, may be processed into various shapes.

Ion conductive inorganic particles may be, for example, lithium ion conductive inorganic particles.

An amount of ion conductive inorganic particles may be, for example, based on the total weight of the composite membrane, in the range of about 10 parts by weight to about 90 parts by weight or about 20 parts by weight to about 80 parts by weight. When the amount of the ion conductive inorganic particles is within these ranges, the composite membrane may have excellent ion conductivity and excellent mechanical strength.

The ion conductive inorganic particles may include one or more selected from a glassy active metal ion conductor, an amorphous active metal ion conductor, a ceramic active metal ion conductor, and a glass-ceramic active metal ion conductor, or a combination thereof.

The ion conductive inorganic particles may include, for example, one or more selected from $Li_{(1+x+y)}Al_xTi_{(2-x)}Si_yP_{(3-y)}O_{12}$ (wherein $0<x<2$ and $0\leq y<3$), $BaTiO_3$, $Pb(Zr_xTi_{(1-x)})O_3$ (PZT), $Pb_{(1-x)}La_xZr_{(1-y)}Ti_yO_3$ (PLZT) (wherein $0\leq x<1$ and $0\leq y<1$), $PB(Mg_3Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, lithium phosphate ($Li_3PO_4$), lithium titanium phosphate ($Li_xTi_y(PO_4)_3$, wherein $0<x<2$ and $0<y<3$), lithium aluminum titanium phosphate ($Li_xAl_yTi_z(PO_4)_3$ wherein $0<x<2$ and $0<y<1$ and $0<z<3$), $Li_{1+x+y}(Al_aGa_{(1-a)})_x(TibGe_{(1-b)})_{2-x}Si_yP_{(3-y)}O_{12}$ (wherein $0\leq x\leq 1$ and $0\leq y\leq 1$), lithium lanthanum titanate ($Li_xLa_yTiO_3$ wherein $0<x<2$ and $0<y<3$), lithium germanium thiophosphate ($Li_xGe_yPzS_w$ wherein $0<x<4$, $0<y<1$, $0<z<1$, and $0<w<5$), lithium nitride glass ($Li_xN_y$ wherein $0<x<4$ and $0<y<2$), $SiS_2$ glass ($Li_xSi_yS_z$ wherein $0<x<3$, $0<y<2$, $0<z<4$), $P_2S_5$ glass ($Li_xP_yS_z$ wherein $0<x<3$, $0<y<3$, and $0<z<7$), $Li_2O$, $LiF$, $LiOH$, $Li_2CO_3$, $LiAlO_2$, $Li_2O$—$Al_2O_3$—$SiO_2$—$P_2O_5$—$TiO_2$—$GeO_2$ ceramic, Garnet ceramics $Li_{3+x}La_3M_2O_{12}$ (M=Te, Nb, or Zr, and x is an integer from 1 to 10), or a combination thereof. The Garnet ceramics may be, for example, $Li_7La_3Zr_2O_{12}$.

In an embodiment, the ion conductive inorganic particles may include, for example, LTAP ($Li_{1.4}Ti_{1.6}Al_{0.4}P_3O_{12}$), or $Li_2O$—$Al_2O_3$—$SiO_2$—$P_2O_5$—$TiO_2$—$GeO_2$ ceramics.

The ion conductive inorganic particles lack, as described above, the interparticular boundary or grain boundary. Accordingly, a composite membrane including the ion conductive inorganic particles may provide a lithium conductive path having a small resistance. Accordingly, high conductivity to lithium ions and high transfer of lithium ions may be provided, and thus, conductivity of lithium ions and the transfer rate of lithium ions may be remarkably improved. In addition, compared to a film formed of inorganic particles alone, high flexibility and high mechanical strength may be provided. Whether the ion conductive inorganic particles are the interparticular (or grain) boundary-free one-body (or single) particle is confirmed by using a scanning electron microscope (SEM).

An average diameter of the ion conductive inorganic particles may be, for example, in the range of about 1 micrometer (μm) to about 300 μm, about 1 μm to about 200 μm, or about 1 μm to about 150 μm. When the average diameter of the ion conductive inorganic particles is within these ranges, a composite membrane including ion conductive inorganic particles, each of which is a grain boundary-free one-body particle, may be manufactured by, for example, grinding in the manufacturing process for the composite membrane.

The ion conductive inorganic particles are uniform in size, and when included in the composite membrane, the ion conductive inorganic particles may retain their uniform sizes. The average particle diameter D50 of the ion conductive inorganic particles may be, for example, in the range of about 110 μm to about 130 μm, and the ion conductive inorganic particles may have an average particle diameter D90 of about 180 μm to about 200 μm, and the average particle diameter D10 of about 60 μm to about 80 μm. Terms "D50, D10, and D90" respectively refer to particle sizes (diameters) indicating 50 vol %, 10 vol %, and 90 vol % in a cumulative distribution curve.

An example of the composite membrane may be used as an anode protective film for a lithium secondary battery, such as a lithium sulfur secondary battery or an aqueous lithium ion secondary battery. Besides, the composite membrane may separate an electrolyte into a cathode electrolyte (catholyte) and an anode electrolyte (anolyte) to increase performance of a lithium ion battery and probability of use of a novel material. When the composite membrane is used as a protective film for a lithium sulfur secondary battery or an aqueous lithium ion secondary battery, an organic film including the crosslinked copolymer forms the non-ion conductive region, and the ion conductive inorganic particles form the ion conductive region.

An amount of the crosslinked copolymer in the composite membrane may be, based on the total amount of 100 parts by weight of the composite membrane, in the range of about 10 parts by weight to about 80 parts by weight, for example, about 50 parts by weight to about 80 parts by weight. When the amount of the crosslinked copolymer is within these ranges, without a decrease in the film-forming properties of the composite membrane, the obtained composite membrane may have excellent properties in terms of lithium ion conductivity, flexibility, and gas blocking properties. The weight average molecular weight (Mw) of the crosslinked copolymer may be, for example, in the range of about 10,000 grams per mole (g/mol) to about 300,000 g/mol. The weight average molecular weight (Mw) may be measured by gel permeation chromatography (GPC). When the weight average molecular weight (Mw) of the crosslinked polymer is within these ranges, the obtained composite membrane may have excellent ionic conductivity, and excellent moisture and gas blocking properties without a decrease in the film-forming properties. The composite membrane includes a high density of ion conductive inorganic particles. Accordingly, the resistance of the composite membrane is low.

In an embodiment, the loading weight of the composite membrane may be in the range of about 5 milligrams per centimeter ($mg/cm^2$) to about 20 $mg/cm^2$, or about 11 $mg/cm^2$ to about 16 $mg/cm^2$. By using the composite membrane having these ranges of loading weight, a thin and light-weight battery may be manufactured.

In another embodiment, the average thickness of the composite membrane may be in the range of about 10 μm to about 200 μm, or about 70 μm to about 100 μm. When the composite membrane has these ranges of thicknesses, the obtained composite membrane may have excellent characteristics in terms of ion conductivity and moisture and gas blocking characteristics. As used herein, the average thickness of the composite membrane may include an average of the combined thicknesses of the ion conductive inorganic particles and the organic film layer of the composite membrane. In other words, when the thickness of the ion conductive inorganic particles and the organic film layer are different, the average of these thicknesses is the average thickness of the composite membrane.

An example of the composite membrane may further include a porous substrate.

The porous substrate may be any suitable substrate that has excellent mechanical characteristics and high heat resistance and has pores therein. The porous substrate may be, for example, an olefin polymer having high chemical resistance and hydrophobic properties; or a sheet or non-woven fabric formed of glass fiber or polyethylene. The olefin polymer may be, for example, polyethylene, polypropylene, or a combination thereof, and the porous substrate may be a mixed multiple-film, for example, a two-layer separator having the structure of polyethylene/polypropylene, a three-layer separator having the structure of polyethylene/polypropylene/polyethylene, and a three-layer separator having the structure of polypropylene/polyethylene/polypropylene. The porous substrate may be, for example, a polyethylene film, a polypropylene film, or a combination thereof. The pore diameter of the porous substrate may be, for example, in the range of about 0.01 μm to about 10 m, and the thickness thereof, may be, for example, in the range of about 5 μm to about 35 μm. The porous substrate may include an electrolytic solution including, for example, a lithium salt and an organic solvent. The amount of the lithium salt may be, for example, in the range of about 0.01 moles per liter (M) to about 5 M, or about 0.2 M to about 2 M. Due the inclusion of these ranges of the lithium salt, the obtained composite membrane may have excellent conductivity. The lithium salt may be dissolved in a solvent to function as, for example, a supplier of lithium ions in a battery. The lithium salt may include, for example, at least one selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{(2x+1)}SO_2)(C_yF_{2y+1}SO_2)$ (wherein x and y are each a natural number), LiF, LiBr, LiCl, LiOH, LiI, and $LiB(C_2O_4)_2$ (lithium bis(oxalato) borate; LiBOB). The composite membrane may further include, in addition to the lithium salt, other metal salts. Examples of these other metal salts are $AlCl_3$, $MgCl_2$, NaCl, KCl, NaBr, KBr, and $CaCl_2$).

Referring to FIG. 5, the composite membrane 20 is a lithium ion transfer channel, and may include LTAP particles 21 embedded in the organic film layer 22, which is a crosslinked copolymer matrix. The composite membrane 20 provides a selective lithium ion transfer path derived from LTAP particles 21, which are single-body particles lacking the grain boundary, and embedded in the organic film layer 22. The organic film layer 22, which is the crosslinked copolymer matrix, may include a crosslinked copolymer obtained by reacting a fluorine-containing first monomer, PFDA which is a fluoro-containing monomer, pentaerythritol tetrakis(3-mercaptopropionate (4T) which is a fluorine-free monomer, and TTT which is a fluorine-free monomer.

Due to the inclusion of the organic film layer 22, which is a non-permeable polymer matrix, the composite membrane 20 is flexible and weighs at most one tenth of the weight of the LTAP-only film. The area resistivity of the composite membrane 20 is decreased as the thickness of the LTAP film increases, and the composite membrane 20 including the lithium ion transfer channel may have an area resistivity of about 29 ohms square centimeter ($\Omega \cdot cm^2$) or less at a temperature of 60° C. The composite membrane may have excellent blocking characteristics with respect to oxygen and moisture, and the swelling thereof with respect to an electrolyte is suppressed.

In an embodiment, the composite membrane may have the gas permeability of about $10^{-3}$ $cm^3$ $cm/m^2$ to about 2,000 $cm^3$ $cm/m^2$ day atm, and the total exposure surface area of the plurality of ion conductive inorganic particles of the composite membrane may be, based on the total surface area of the composite membrane, in the range of about 30% to about 80%. The composite membrane may have excellent blocking characteristics with respect to oxygen and moisture, and the swelling thereof with respect to an electrolyte is suppressed.

Another aspect of the disclosure provides an anode structure including an anode and the composite membrane described above.

The anode structure may further include, for example, an electrolyte between the anode and the composite membrane.

Figure 6:
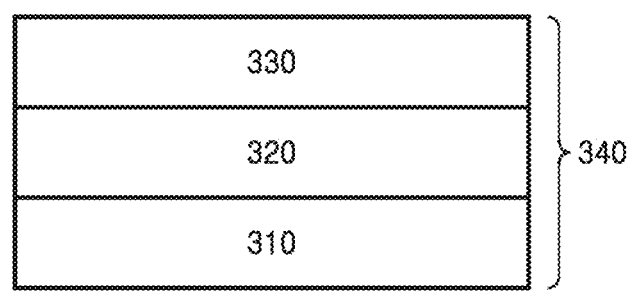
FIG. 6 is a cross-sectional view of an anode structure according to an embodiment.

Referring to FIG. 6, the anode structure includes an anode 310, a composite membrane 330, and an electrolyte 320 therebetween. In one or more embodiments, the electrolyte 320 may be omitted.

The anode 310 may be, for example, a lithium metal thin film, and the composite membrane 330 may function as a protective film for lithium metal. Accordingly, a composite membrane according to an embodiment has excellent properties in terms of flexibility and light-weightness and oxygen blocking properties and the swelling ratio thereof with respect to an electrolyte.

The electrolyte 320 may be, for example, an aqueous electrolyte or a nonaqueous electrolyte. Such an electrolyte may be identical to or different from an electrolyte used in manufacturing a lithium air battery or a lithium metal battery.

Accordingly, since due to the composite membrane 330 included in the anode structure, the deterioration of the anode 310 caused by external gas and an electrolyte is suppressed, an electrochemical device including the anode structure may have improved cyclic characteristics.

Another aspect of the disclosure provides a lithium battery including the composite membrane described above.

An example of the lithium battery is a lithium air battery. The lithium air battery includes an anode, a composite membrane, and a cathode using oxygen as a cathode active material.

The lithium air battery may use an aqueous electrolyte or a nonaqueous electrolyte as the electrolyte between the cathode and the anode.

When the nonaqueous electrolyte is used as the electrolyte, for example, the reaction mechanism shown in Reaction Scheme 1 may be used.

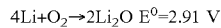

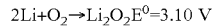            Reaction Scheme 1

During discharging, lithium derived from the anode combines with oxygen introduced from the cathode to produce a lithium oxide and the oxygen is reduced. On the other hand, during charging, the lithium oxide is reduced and the oxygen is oxidized.

The shape of the lithium air battery is not limited, and may have, for example, a coin shape, a button shape, a sheet shape, a stack shape, a cylindrical shape, a flat shape, a cone shape. The lithium battery may be applied to large batteries used in electric vehicles.

Figure 7:
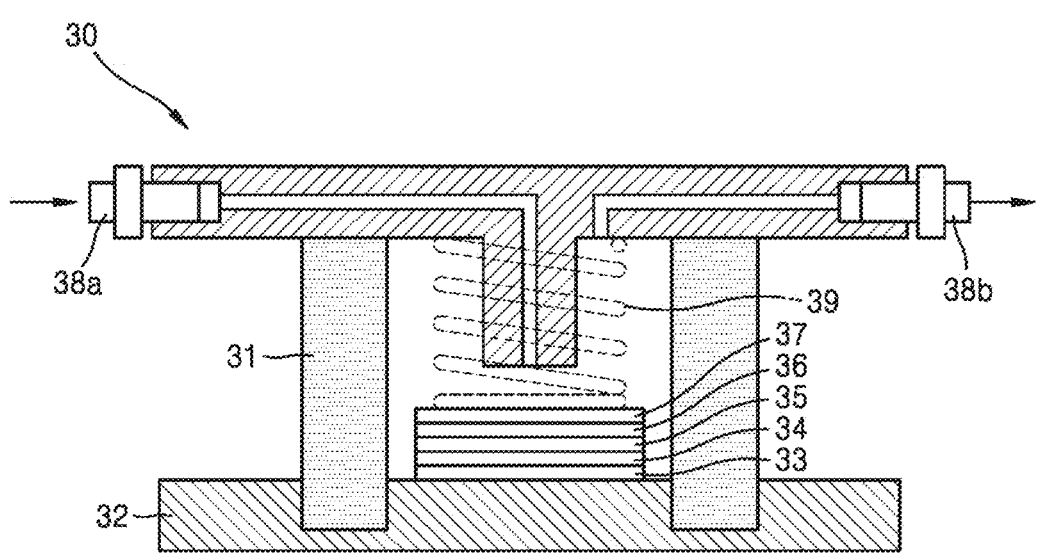
FIG. 7 is a schematic view of a lithium air battery including a composite membrane according to an embodiment.

Referring to FIG. 7, a lithium air battery 30 includes a composite membrane 35 arranged between a cathode 37, using oxygen as an active material, and an anode 33 placed on a substrate 32. An electrolyte 34 is arranged between the anode 33 and the composite membrane 35. The anode 33, the electrolyte 34, and the composite membrane 35 may constitute a protective anode. The electrolyte 34 has excellent lithium ion conductivity and has a small resistance per unit area when combined with the anode 33. In an example of the lithium air battery 30, the lithium air battery 30 may further include a lithium ion conductive solid electrolyte film (not shown) or a separator (not shown) between the anode 33 and the electrolyte 34 or between the electrolyte 34 and the composite membrane 35. The cathode 37 includes a current collector, and a pressing member 39 may be placed on the current collector. The pressing member 39 allows the air to arrive at the cathode 37. A case 31 is placed to surround the cathode 37 and the anode 33. The case 31 includes an insulating resin. The air is supplied through an air inlet 38a and discharged through an air outlet 38b. The term "air" is not limited to atmospheric air, and may include a combination of gases, including oxygen, or pure oxygen gas. An electrolyte 36 is placed between the composite membrane 35 and the cathode 37. In an example of the lithium air battery 30, a lithium ion conductive solid electrolyte membrane (not shown) or a separator (not shown) may be further located between the cathode 37 and the electrolyte 36 or between the electrolyte 36 and the composite membrane 35. The composite membrane 35 may be placed above the surface of the anode 33 to function as a protective film for protecting lithium from the electrolyte 34. The composite membrane 35 may be a monolayer or a multi-layer.

Each of the electrolytes 34 and 36 may be, for example, a polymer solid electrolyte. The polymer solid electrolyte is a poly ethylene oxide doped with lithium salt, and the lithium salt may be, for example, one or more of $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_2F)_2$, $LiC_4F_9SO_3$, $LiAlCl_4$, or the like.

In another embodiment, each of the electrolytes 34 and 36 may be a liquid electrolyte including a solvent and a lithium salt. The solvent may include at least one selected from an aprotic solvent and water. The aprotic solvent may be, for example, a carbonate solvent, an ester solvent, an ether solvent, a ketone solvent, an amine solvent, or a phosphine solvent. The carbonate solvent may be, for example, dimethyl carbonate (DMC), diethyl carbonate (DEC), ethyl methyl carbonate (EMC), dipropyl carbonate (DPC), methyl propyl carbonate (MPC), ethyl propyl carbonate (EPC), propylene carbonate (PC), or butylene carbonate (BC). The ester solvent may be, for example, methyl acetate, ethyl acetate, n-propyl acetate, tert-butyl acetate, methyl propionate, ethyl propionate, γ-butyrolactone, decanolide, valerolactone, mevalonolactone, or caprolactone. The ether solvent may be, for example, dibutyl ether, tetraglyme, diglyme, dimethoxyethane, 2-methyltetrahydrofuran, or tetrahydrofuran. The ketone solvent may be, for example, cyclohexanone. The amine solvent may be, for example, triethylamine or triphenylamine. The phosphine solvent may be, for example, triethylphosphine. However, the solvents described above are not limited thereto, and any aprotic solvent that is used in the art is available for use as the solvent herein. In addition, the aprotic solvent may be, for example, a nitrile, such as R—CN (R is a linear, branched, or cyclic hydrocarbon group having 2 to 30 carbon atoms, and may contain a double bond, an aromatic ring, or an ether bond), an amide, such as dimethylformamide, or a dioxolane, such as 1,3-dioxolane, or a sulfolane.

These non-protonic solvents may be used alone or in combination of one or more thereof. When one or more of the non-protonic solvents are used in combination, the mixed ratio may appropriately be adjusted according to the performance of a battery, which is obvious to one of ordinary skill in the art.

In an embodiment, each of the electrolytes 34 and 36 includes an ionic liquid. The ionic liquid may be, for example, a linear, branched, substituted ammonium, imidazolium, pyrrolidinium, or a compound constituted of a piperidinium cation and an anion selected from $PF_6^-$, $BF_4^-$, $CF_3SO_3^-$, $(CF_3SO_2)_2N^-$, $(C_2F_5SO_2)_2N^-$, $(FSO_2)_2N^-$, and $(CN)_2N^-$.

In an embodiment, each of the electrolytes 34 and 36 may partially or entirely impregnate a cathode or an anode.

In another embodiment, each of the electrolytes 34 and 36 may be a lithium ion conductive solid electrolyte membrane. The lithium ion conductive solid electrolyte membrane may be, for example, lithium ion conductive glass, lithium ion conductivity crystals (ceramic or glass-ceramic), or an inorganic material including the combination thereof. When chemical stability is taken into consideration, the lithium ion conductive solid electrolyte membrane contains oxides. When the lithium ion conductive solid electrolyte membrane includes lithium ion conductivity crystals in great quantities, high ion conductivity may be obtained. Accordingly, the amount of the lithium ion conductivity crystals may be, for example, based on the total weight of the solid electrolyte membrane, about 50 wt % or greater, about 55 wt % or greater, or about 60 wt % or greater. Lithium ion conductivity crystals may be, for example, a perovskite structure crystal having lithium ion conductivity, such as $Li_3N$, LISICON or $La_{0.55}Li_{0.35}TiO_3$, $LiTi_2P_3O_{12}$ having a NASICON-type structure, or a glass-ceramic that precipitates these crystals. Lithium ion conductivity crystals may be, for example, $Li_{(1+x+y)}(Al, Ga)_x(Ti, Ge)_{(2-x)}Si_yP_{(3-y)}O_{12}$ (wherein 0≤x<1 and 0≤y≤1, for example, 0≤x≤0.4 and 0<y≤0.6, or 0.1≤x≤0.3 and 0.1<y≤0.4). To have high ion conductivity, lithium ion conductivity crystals need not have the grain boundary that interrupts ion conduction. For example, the glass-ceramic does not have pores or grain boundaries which disrupt ion conduction, and thus, the glass-ceramic has high ion conductivity and excellent chemical stability. The glass-ceramic, which is lithium ion conductive, may be, for example, lithium-aluminum-germanium-phosphate (LAGP), lithium-aluminum-titanium-phosphate (LATP), or lithium-aluminum-titanium-silicon-phosphate (LATSP). For example, when a mother glass has the composition of $Li_2O$—$Al_2O_3$—$TiO_2$—$SiO_2$—$P_2O_5$, and the mother glass is crystallized by a heat treatment, a main crystal phase is $Li_{(1+x+y)}Al_xTi_{(2-x)}Si_yP_{(3-y)}O_{12}$ (wherein 0≤x≤2 and 0≤y≤3) where x and y may satisfy the conditions of, for example, 0≤x≤0.4 and 0<y≤0.6, or 0.1≤x≤0.3 and 0.1≤y≤0.4. The pore or grain boundary that interrupts ion conduction refers to an ion conductive inhibiting material, such as a pore or grain boundary, that reduces the conductivity of an inorganic material including lithium ion conductive crystals to at most one tenth of the conductivity of the lithium ion conductive crystals, e.g., single crystal not including the pore or grain boundary, in the inorganic material.

The cathode 37, which uses oxygen as the cathode active material, includes a conductive material. The conductive material may be, for example, porous. Therefore, any conductive material having porosity and conductivity is used without limitation herein for use as the conductive material.

The conductive material may be, for example, a carbonaceous conductive material with porosity. Examples of the carbonaceous conductive material are carbon blacks, graphites, graphenes, activated carbons, and carbon fibers. The conductive material may be, for example, a metallic conductive material, such as a metal fiber or a metal mesh. The metallic conductive material may be, for example, metallic powder, such as one or more of copper, silver, nickel, or aluminum. In addition, the conductive material may be, for example, an organic conductive material, such as a polyphenylene derivative. These conductive materials may be used alone or in combination.

In an embodiment, a catalyst for oxidizing/reducing of oxygen may be added to the cathode 37, and the catalyst may be a precious metal catalyst, such as one or more of platinum, gold, silver, palladium, ruthenium, rhodium, or osmium; a metal oxide catalyst, such as one or more of manganese oxide, iron oxide, cobalt oxide, or nickel oxide; or an organometallic catalyst, such as cobalt phthalocyanine. However, the catalyst is not limited thereto, and any suitable material that is used as a catalyst for oxidizing/reducing oxygen, including one in the art, may be available for use as the catalyst herein.

In another embodiment, the catalyst may be supported by or on a carrier. The carrier may be, for example, an oxide, zeolite, clay mineral, or carbon. The oxide may be, for example, one or more of alumina, silica, zirconium oxide, or titanium dioxide. The oxide may include at least one metal selected from Ce, Pr, Sm, Eu, Tb, Tm, Yb, Sb, Bi, V, Cr, Mn, Fe, Co, Ni, Cu, Nb, Mo, and W. The carbon may be, for example, carbon black, such as one or more of Ketjen black, acetylene black, channel black, or lamp black; graphite, such as one or more of natural graphite, artificial graphite, or expanded graphite; activated carbon, or carbon fibers. However, the carbon is not limited thereto, and any suitable material that is used as carrier, including one in the art, is available for use as the carbon used herein.

In an embodiment, the cathode 37 may further include a binder. The binder includes a thermoplastic resin or a thermosetting resin. The binder may be, for example, polyethylene, polypropylene, polytetrafluoroethylene (PTFE), polyvinylidene fluoride (PVDF), styrene-butadiene rubber, a tetrafluoroethylene-perfluoroalkyl vinyl ether copolymer, a vinylidene fluoride-hexafluoropropylene copolymer, a vinylidene fluoride-chlorotrifluoroethylene, an ethylene-tetrafluoroethylene copolymer, polychlorotrifluoroethylene, a vinylidene fluoride-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, an ethylene-acrylic acid copolymer, or a combination thereof. However, the binder is not limited thereto, and any suitable material that is used as a binder may be available for use as the binder herein.

In an embodiment, the cathode 37 may be prepared in such a manner that the oxygen oxidizing/reducing catalyst, the conductive material, and the binder are mixed, and then, an appropriate solvent is added to the mixture to prepare cathode slurry, and the cathode slurry is coated and dried on a current collector, or optionally, the mixture may be compression-molded on the current collector to increase the density of an electrode. In one embodiment, the cathode may optionally include a lithium oxide. In one embodiment, the oxygen oxidizing/reducing catalyst may be omitted.

The current collector may include a porous material having, for example, a net shape or a mesh shape, and may be a porous metal plate including, for example, stainless steel, nickel, or aluminum. However, the current collector is not limited thereto, and any material that is used as the current collector in the art may be available herein for use as the current collector herein. In one embodiment, the current collector may be coated with an oxidation-resistant metal or an alloy coating to prevent oxidation.

As the anode 33 of lithium air battery 30, an anode including lithium may be an electrode including Li metal, Li metal-based alloy, or a material that intercalates or deintercalates Li. However, the anode including lithium is not limited thereto, and any material that is used as an anode in the art and contains lithium or enable intercalation or deintercalation of lithium may be available for use as the anode herein. The anode 33 may determine the capacity of the lithium air battery 30. The anode 33 may be, for example lithium, a metal thin film. The lithium metal-based alloy may be, for example, an alloy of lithium and at least one selected from aluminum, tin, magnesium, indium, calcium, titanium, and vanadium.

In an example of the lithium air battery 30, a separator (not shown) may be placed between the cathode 37 and the anode 33. Any separator may be used herein as long as the separator has a composition that endures the use range of a lithium air battery. For example, the separator may be a non-woven polymer fabric, such as a non-woven polypropylene fabric or a non-woven polyphenylene sulfide fabric, or a porous film of an olefin-based resin, such as polyethylene or polypropylene. These fabrics and porous films may be used alone or in combination.

Since the lithium air battery 30 includes the composite membrane 35, non-capacity and lifespan characteristics may be improved.

An example of a lithium secondary battery is a lithium sulfur secondary battery or a lithium ion secondary battery. A lithium battery is, for example, a lithium metal battery including lithium metal as an anode.

Figure 8:
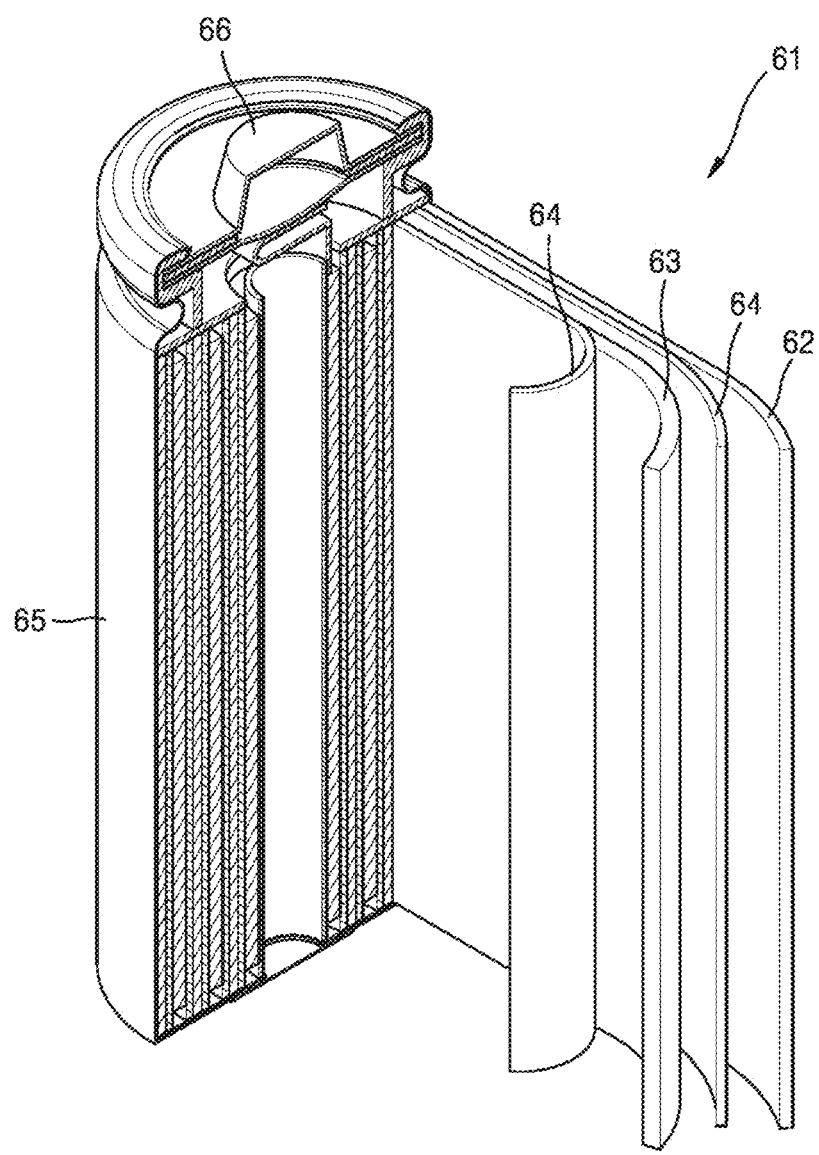
FIG. 8 is a schematic view of a lithium battery according to an embodiment.

Referring to FIG. 8, a lithium ion battery 61 includes a cathode 63, an anode 62, and a separator 64. The cathode 63, the anode 62, and the separator 64 are wound or folded and housed in a battery case 65. An organic electrolytic solution is then injected into the battery case 65 and sealed with a cap assembly 66 to complete the manufacturing of the lithium ion battery 61. The battery case 61 may be cylindrical as shown in FIG. 8 or, for example, square or of thin film type. A lithium battery may be, for example, a thin film battery.

The separator 64 is arranged between the cathode 63 and the anode 62 to form a battery assembly. A plurality of such battery assemblies are stacked in a bi-cell structure, and then, impregnated with an organic electrolytic solution. The result is housed in a pouch and sealed, thereby completing the manufacturing of a lithium ion polymer battery.

In an example of the lithium ion battery 61, the composite membrane (not shown) described above is placed on at least one surface of the anode 62, for example, a lithium metal anode to protect the anode 62.

In the case of a lithium sulfur battery, a carbonaceous material, which reversibly enables intercalation/deintercalation of lithium ions, a material that reacts with lithium ions to reversibly form a lithium-containing compound, or a lithium alloy is used as an anode active material for an anode.

Any suitable carbonaceous anode active material used in lithium sulfur secondary batteries is available for use as the carbon material herein. A carbonaceous anode active material may be, for example, crystalline carbon, amorphous carbon, or a mixture thereof. The material that reacts with lithium ions to reversibly form a lithium-containing compound may be, for example, tin oxide ($SnO_2$), titanium nitride, silicon (Si), or the like. The lithium alloy may be, for example, an alloy of lithium and at least one metal selected from Na, K, Rb, Cs, Fr, Be, Mg, Ca, Sr, Ba, Ra, Al, and Sn.

In a lithium sulfur battery, a cathode active material may be, for example, elemental sulfur ($S_8$), an elemental sulfur-containing compound, or a combination thereof, and the elemental sulfur-containing compound may be, for example, at least one selected from $Li_2S_n$ (wherein n≥1), $Li_2S_n$ (n≥1) dissolved in catholyte, an organic sulfur compound, and a carbon-sulfur polymer (($C_2S_x)_n$ wherein x=2.5 to 50 and n≥2).

In the case of the lithium ion battery, the cathode active material may be, for example, a compound that reversibly enables intercalation and deintercalation of lithium (lithiated intercalation compound). The cathode active material may include, for example, at least one selected from a lithium cobalt oxide, a lithium nickel cobalt manganese oxide, a lithium nickel cobalt aluminum oxide, a lithium iron phosphate, and a lithium manganese oxide. However, the cathode active material is not limited thereto, and any suitable material that is used as the cathode active material, including one in the art, may be available therein for use as the cathode active material.

The cathode active material may be, for example, a lithium cobalt oxide of Formula $LiCoO_2$; a lithium nickel oxide of Formula $LiNiO_2$; a lithium manganese oxide of Formula $Li_{1+x}Mn_{2-x}O_4$ (wherein x is in the range of 0 to 0.33), $Li_2MnO_3$, $LiMn_2O_3$, or $LiMnO_2$; a lithium copper oxide of Formula $Li_2CuO_2$; a lithium iron oxide of Formula $LiFe_3O_4$; a lithium vanadium oxide of Formula $LiV_3O_8$; a copper vanadium oxide of Formula $Cu_2V_2O_7$; a vanadium oxide of Formula $V_2O_5$; a lithium nickel oxide of Formula $LiNi_{(1-x)}M_xO_2$ (wherein M is Co, Mn, Al, Cu, Fe, Mg, B, or Ga, and x is in the range of 0.01 to 0.3); a lithium manganese composite oxide of Formula $LiMn_{(2-x)}M_xO_2$ (wherein M=Co, Ni, Fe, Cr, Zn, or Ta, and x is in the range of 0.01 to 0.1), or $Li_2Mn_3MO_8$ (wherein M=Fe, Co, Ni, Cu, or Zn); a lithium manganese oxide of Formula $LiMn_2O_4$ wherein some Li are substituted with an alkali earth-metal ion; a disulfide compound; or an iron molybdenum oxide of Formula $Fe_2(MoO_4)_3$.

The anode active material may be, for example, a carbonaceous material, silicon, a silicon oxide, a silicon alloy, a silicon-carbon material composite, tin, a tin alloy, a tin-carbon composite, a metal oxide, or a combination thereof.

The carbonaceous material may be, for example, one or more of carbon, graphite, or carbon nanotube.

The anode active material for a lithium ion battery is selected from, for example, Si, $SiO_x$ ($0<x<2$, for example, 0.5 to 1.5), Sn, $SnO_2$, or a silicon-containing metal alloy, and a mixture thereof. A metal that enables the production of a silicon-containing metal alloy may be, for example, at least one selected from Al, Sn, Ag, Fe, Bi, Mg, Zn, In, Ge, Pb, and Ti.

The anode active material may include, for example, a metal/metalloid alloy capable of alloying with a lithium, or an alloy or oxide thereof. For example, the metal/metalloid alloy capable of alloying with a lithium, and the alloy or oxide thereof may be Si, Sn, Al, Ge, Pb, Bi, SbSi—Y' alloy (where Y' is an alkali metal, an alkaline earth metal, a Group 13 element to a Group 16 element, a transition metal, a rare earth element or a combination element thereof, and is not Si), Sn—Y" alloy (where Y" is an alkali metal, an alkaline earth metal, a Group 13 element to a Group 16 element, a transition metal, a rare earth element or a combination element thereof, and is not Sn), or $MnO_x$ ($0<x≤2$). The element Y' and Y" may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, TI, Ge, P, As, Sb, Bi, S, Se, Te, Po, or a combination thereof.

An oxide of the metal/metalloid alloy capable of alloying with a lithium may be, for example, a lithium titanium oxide, a vanadium oxide, a lithium vanadium oxide, $SnO_2$, or $SiO_x$ ($0<x<2$).

An example of the anode active material includes, for example, at least one element selected from Group 13 elements, Group 14 elements, and Group 15 elements of the Periodic Table of Elements. The anode active material may include, for example, at least one element selected from Si, Ge, and Sn.

An example of the anode active material is a mixture of a carbonaceous material and one selected from silicon, silicon oxide, silicon-containing metal alloy or a composite of a carbonaceous material and one selected from silicon, silicon oxide, silicon-containing metal alloy.

The anode active material may be, for example, simple nanoparticles or a nano-sized nanostructure. For example, the anode active material has various nanostructures, such as nanoparticles, nanowires, nanorods, nanotubes, and nanobelts.

A separator between a cathode and an anode may have a mixed multi-layer structure, such as a two-layered separator having the structure of polyethylene/polypropylene, a three-layer separator having the structure of polyethylene/polypropylene/polyethylene, or a three-layer separator having the structure of polypropylene/polyethylene/polypropylene.

An electrolytic solution for a lithium ion battery may include an organic solvent and a lithium salt.

The organic solvent may include, for example, at least one solvent selected from benzene, fluorobenzene, toluene, dimethylformamide, dimethylacetate, trifluorotoluene, xylene, cyclohexane, tetrahydrofuran, 2-methyltetrahydrofuran, cyclohexanone, ethanol, isopropyl alcohol, dimethyl carbonate, ethyl Methyl carbonate, diethyl carbonate, methyl propyl carbonate, methyl propionate, ethyl propionate, methyl acetate, ethyl acetate, propyl acetate, dimethoxyethane, 1,3-dioxolane, diglyme, tetraglyme, ethylene carbonate, propylene carbonate, γ-butyrolactone, and sulfolane.

The lithium salt may include, for example, at least one lithium salt selected from lithium hexafluorophosphate ($LiPF_6$), lithium tetrafluoroborate ($LiBF_4$), lithium hexafluoroazenate ($LiAsF_6$), lithium perchlorate ($LiClO_4$), lithium trifluoromethane sulfonate ($LiSO_3CF_3$), lithium bis (trifluoromethylsulfonyl) imide ($LiN(SO_2CF_3)_2$, lithium bis (perfluoroethylsulfonyl)imide ($LiN(SO_2C_2F_5)_2$).

The concentration of lithium salt in an electrolytic solution may be, for example, in the range of about 0.01 M to about 5 M, or about 0.1 M to about 2.0 M.

In the lithium battery such as the lithium sulfur battery and the lithium ion battery described above, a lithium anode is protected, and thus, the side reaction between the lithium anode and an electrolytic solution is suppressed, and the lithium ion conductivity is improved, leading to an improvement in conductivity and lifetime characteristics.

Another aspect of the disclosure provides a method of manufacturing a composite membrane. The method includes placing a plurality of ion conductive inorganic particles on a substrate; disposing a mixture including a polymerizable composition and a solvent among the plurality of ion conductive inorganic particles; removing the solvent from the mixture; and polymerizing the polymerizable composition to form the composite membrane comprising an organic film layer and a plurality of ion conductive inorganic particles disposed in the organic film layer. The polymerizable composition may include one or more polymerizable compounds, such as the monomers provided herein. The organic film layer may include the crosslinked copolymer.

Figure 9:
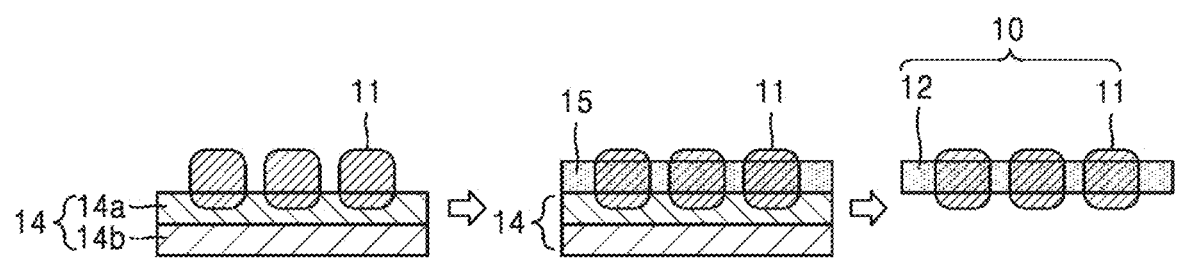
FIG. 9 is a schematic representation that illustrates a method of preparing a composite membrane according to an embodiment.

Referring to FIG. 9, ion conductive inorganic particles 11 are arranged on a substrate 14. The substrate 14 may be an adhesive substrate. The substrate 14 includes a non-adhesive substrate 14b and an adhesive layer 14a. The ion conductive inorganic particles 11 are adhered and fixed on the substrate 14, which is adhesive. Accordingly, during the following addition and polymerization of a mixture 15, there is no need to consider the movement of ion conductive inorganic particles 11, leading to a simplification of the manufacturing process for the composite membrane.

Next, the mixture 15 containing a polymerizable composition and a solvent is placed among the ion conductive inorganic particles 11. The placing of the mixture 15 may be performed by, for example, spin coating. However, the placing method is not limited thereto, and any suitable method that is used in the art to place the mixture among particles uniformly may be available for use herein. For example, the thickness of a uniformly placed mixture is a thickness with which the mixture does not completely cover the surfaces of ion conductive inorganic particles.

The polymerizable composition included in the mixture 15 includes, for example, a polyfunctional fluoro-containing monomer represented by one of Formulae 14 to 18:

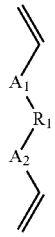

Formula 14

Formula 15

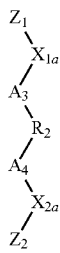

Formula 16

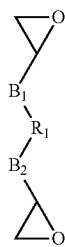

Formula 17

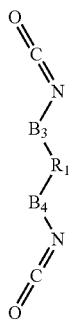

Formula 18

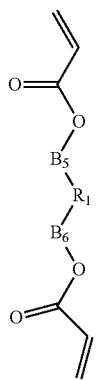

In Formulae 14 to 18 above, $A_1$, $A_2$, $A_3$, and $A_4$ may each independently a covalent bond, —C(=O)—O—, —C(=O)—, or a C1 to C5 linear or branched alkylene group, $B_1$, $B_2$, $B_3$, and $B_4$ may each independently a covalent bond, or a C1 to C5a linear or branched alkylene group, $R_1$ and $R_2$ may each independently be a C1 to C10 linear or branched alkylene group substituted or unsubstituted with halogen; or -(—$R_a$—O—)$_k$— wherein k is an integer from 2 to 100 and $R_a$ may be a C2 to C10 alkylene group; a C6 to C10 cycloalkylene group; a C6 to C10 arylene group; or a C2 to C10 heteroarylene group, each of $R_1$ and $R_2$ is substituted with at least one fluorine atom, $X_{1a}$ and $X_{2a}$ may each independently be —O— or —S—, and $Z_1$ and $Z_2$ may each independently be a hydrogen atom, a C1 to C5 alkyl group or a C1 to C5 fluroalkyl group.

In an embodiment, the polymerizable composition may include a compound capable of forming the repeating unit represented by one of Formulae 4 to 13, which is a polyfunctional fluorine-free monomer.

Based on the total weight of the polymerizable composition, an amount of the polyfunctional fluoro-containing monomer may be, for example, in the range of about 1 wt % to about 50 wt %, about 1 wt % to about 45 wt %, about 1 wt % to about 40 wt %, or about 1 wt % to about 35 wt %, and an amount of at least one polyfunctional fluorine-containing monomer may be, for example, in the range of about 50 wt % to about 99 wt %, about 55 wt % to about 99 wt %, about 60 wt % to about 99 wt %, or about 65 wt % to about 99 wt %.

Since the polymerizable compound includes the polyfunctional fluoro-containing monomer, a crosslinked copolymer produced by polymerization includes fluorine, and ultimately, the swelling of the fluoro-containing crosslinked copolymer with respect to an electrolyte may be suppressed.

Then, the solvent is removed from the mixture 15. The removal of the solvent may be carried out at a temperature of about 25° C. to about 60° C. Once the solvent is removed, ion conductive inorganic particles are embedded in a thin film of the polymerizable compound.

After the solvent is removed, heat or light is applied to perform the polymerization reaction (cross-linking). Once the polymerization is performed, for example completely performed, a composite membrane 10 including an organic film layer 12 including a crosslinked copolymer and a plurality of ion conductive inorganic particles 11 is formed on the adhesive substrate.

In an example of the method of manufacturing the composite membrane, the method further includes separating the composite membrane from the adhesive substrate. In one embodiment, the composite membrane formed on the adhesive substrate is immersed in a water bath, and then, the adhesive substrate is removed to obtain the composite membrane 10.

In an example of the method of manufacturing the composite membrane, a polymerization initiator is added to the mixture containing the polymerizable compound and the solvent. The polymerization initiator may be a photopolymerization initiator or a thermal polymerization initiator.

The initiator may be any suitable compound that is capable of forming a radical by light such as ultraviolet rays. The photopolymerization initiator may be, for example, at least one selected from 2-hydroxy 2-methyl-1-phenyl-propan-1-one (HMPP), benzoin ether, dialkyl acetophenone, hydroxyl alkylketone, phenyl glyoxylate, benzyl dimethyl ketal, acyl phosphine, and α-aminoketone. An example of the acyl phosphine is a commercially available LUCIRIN TPO (available from BASF), that is, 2,4,6-trimethyl-benzoyl-trimethyl phosphine oxide.

The thermal polymerization initiator may include at least one selected from a persulfate initiator, an azo initiator, and an initiator group including hydrogen peroxide and ascorbic acid. The persulfate initiator may be, for example, sodium persulfate ($Na_2S_2O_8$), potassium persulfate ($K_2S_2O_8$), or ammonium persulfate (($NH_4$)$_2S_2O_8$), and the azo-based initiator may be, for example, 2,2-azobis(2-amidinopropane) dihydrochloride, 2,2-azobis-(N, N-dimethylene) isobutyramidine dihydrochloride, 2-(carbamoylazo)isobutylonitril, 2,2-azobis[2-(2-imidazolin-2-yl)propane] dihydrochloride), or 4,4-azobis-(4-cyanovaleric acid).

In an embodiment, the polymerization initiator may be included in the polymerizable composition in an amount of about 0.005 parts by weight to about 10.0 parts by weight based on 100 parts by weight of the polymerizable composition. When the polymerization initiator has these ranges of amount, the reactivity of the polymerization of the polymerizable compound is excellent.

The light may be, for example, ultraviolet (UV) light. As described above, since the polymerization is performed by using light, when a composite membrane is formed on a lithium metal thin film, the deformation of the lithium metal thin film caused by heat may be prevented. For example, an electrolyte is formed between the lithium metal thin film and the composite membrane.

The time for polymerizing (crosslinking) reaction with light or heat may be, for example, 1 minute to 30 minutes.

When heat is applied, the heat treatment varies according to the type of polymerizable compound, etc. For example, the heat treatment is conducted at a temperature of about 60° C. to about 200° C., or about 60° C. to about 100° C.

An amount of a polymerizable (floating) composition that is disposed on the substrate may be, based on 100 parts by weight of ion conductive inorganic particles, in the range of about 10 to about 1,000 parts by weight, for example, about 150 parts by weight to about 900 parts by weight. When the amount of the polymerizable composition is within these ranges, without a decrease in moisture and gas blocking characteristics, the composite membrane has excellent ion conductivity and suppressed swelling against an electrolyte.

The size of the ion conductive inorganic particles is a very important factor in the ion conductivity of the composite membrane. Therefore, the size of the ion conductive inorganic particles is appropriately controlled to obtain uniform particles in size. For this purpose, ion conductive inorganic particles having a target average particle diameter are collected through sieving of ion conductive inorganic particles.

The average particle size of the ion conductive inorganic particles may be in the range of about 1 μm to about 300 μm, about 1 μm to about 200 μm, or about 1 μm to about 100 μm. In an embodiment, an average particle diameter of the ion conductive inorganic particles may be in the range of about 90 μm to about 200 μm, or about 90 μm to about 100 μm.

In an example of the method of manufacturing the composite membrane, to obtain ion conductive inorganic particles having these ranges of particle diameters, grinding is performed in such a way that an average diameter of the ion conductive inorganic particles is in the range of about 1 μm to about 300 μm, followed by classifying the obtained particles.

For grinding, a bead mill or the like may be used. The grinding process is performed by using beads, and the diameter of beads may be, for example, in the range of about 0.5 mm to about 2 mm, and the revolution per minute (rpm) of a grinder may be in the range of about 1000 rpm to about 2000 rpm. When the particle diameter of beads and the revolution per minute of the grinder are within these ranges, the fine-grinding of ion conductive inorganic particles, for example, LTAP may be effectively suppressed. A material for the beads may be, but is not limited to, zirconia beads or alumina beads.

The composite membrane formed on the adhesive substrate may be washed by using, for example, acetone. Then, drying may be performed at room temperature (25° C.) to about 85° C.

The thickness of the composite membrane may be in the range of about 10 μm to about 200 μm, for example, about 70 μm to about 100 μm.

The composite membrane is a lithium ion conductive membrane, and protects an anode that enables intercalation or deintercalation of lithium ions, and selectively allows only lithium ions to pass therethrough to prevent other materials to react with the anode. Also, the protective film reduces the resistance, improves the ion conductivity, and inhibits the swelling with respect to the electrolyte.

Substituents in the formulae above may be defined as follows.

The term 'substituent' used herein is derived by exchanging at least one hydrogen atom of an unsubstituted mother group with other atoms or functional groups. Unless described otherwise, when a mother group and/or functional group is considered as "being substituted", the group is substituted with at least one substituent selected from a halogen atom, a C1 to C20 alkyl group substituted with a halogen atom (for example, $CF_3$, $CHF_2$, $CH_2F$, $CCl_3$, or the like), a C1 to C40 alkyl group, a C2 to C40 alkenyl group, a C2 to C40 alkynyl group, a C3 to C40 cycloalkyl group, a C3 to C40 cycloalkenyl group, and a C6 to C40 aryl group. When it is described that the functional group is "selectively substituted" substrate, this means that the functional group is substitutable with the above-described substituents.

Regarding the term "Ca to Cb" used herein, a and b each indicate the number of carbon atoms of a particular functional group. That is, the functional group contains carbon atoms in the number of a to b. For example, the term "a C1 to C4 alkyl group" is a Ca to Cb group where a is 1 and b is 4, and refers to an alkyl group having one to four carbon atoms, that is, for example $CH_3-$, $CH_3CH_2-$, $CH_3CH_2CH_2-$, $(CH_3)_2CH-$, $CH_3CH_2CH_2CH_2-$, $CH_3CH_2CH(CH_3)-$, or $(CH_3)_3C-$.

Nomenclature for certain radicals includes mono-valent radicals or di-valent radicals, depending on the context. For example, when a substituent needs two linking points with respect to the remaining molecule, these substituents shall be understood as a di-valent radicals. For example, a substituent specified as an alkyl group requiring two linking points may include a di-valent radical, such as $-CH_2-$, $-CH_2CH_2-$, $-CH_2CH(CH_3)CH_2-$, or the like. Other radical nomenclature, such as "alkylene" clearly indicates that these radicals are di-valent radicals.

The term "alkyl group" or "alkylene group" used herein refers to a branched or non-branched aliphatic hydrocarbon group. In one embodiment, the alkyl group may be unsubstituted or substituted. The alkyl group may include methyl, ethyl, propyl, isopropyl, butyl, isobutyl, tert-butyl, pentyl, hexyl, or the like, but is not limited thereto. These alkyl groups may each be selectively substituted or unsubstituted. A C1 to C6 alkyl group refers to, for example, methyl, ethyl, propyl, isopropyl, butyl, iso-butyl, sec-butyl, pentyl, 3-pentyl, or hexyl, but is not limited thereto. The alkyl group further includes cycloalkyl groups and cycloalkylene groups. The cycloalkyl group may include cyclopropyl, a cyclopentyl group, a cyclohexyl group, a cycloheptyl group, or the like, but is not limited thereto.

The term "alkenyl group" used herein refers to a branched or unbranched C2 to C20 hydrocarbon group having at least one C—C double bond, and may be an ethenyl group, a 1-propenyl group, a 2-propenyl group, a 2-methyl-1-propenyl group, a 1-butenyl group, a 2-butenyl group, but is not limited thereto. In one embodiment, the alkenyl group may be unsubstituted or substituted. In one embodiment, the alkenyl group may have 2 to 40 carbon atoms. The alkenyl group further includes cycloalkenyl groups. The cycloalkenyl group may be a cyclopropenyl group, a cyclopentenyl group, a cyclohexenyl group, or a cycloheptenyl group, but is not limited thereto.

The term "alkynyl group" used herein refers to a C2 to C20 hydrocarbon group having at least one C—C triple bond, and may be an ethynyl group, a 1-propynyl group, an isopropynyl group, a 1-butynyl group, or a 2-butynyl group, but is not limited thereto. In one embodiment, the alkynyl group may be unsubstituted or substituted. In one embodiment, the alkynyl group may have 2 to 40 carbon atoms.

The term "cycloalkyl group" used herein refers to a fully saturated carbocyclic ring or ring system. For example, the cycloalkyl group may be a cyclopropyl, a cyclobutyl, a cyclopentyl, or a cyclohexyl. The term "cycloalkylene" refers to a divalent or trivalent cycloalkyl group.

The term "aliphatic" means a saturated or unsaturated linear or branched hydrocarbon group. An aliphatic group may be an alkyl, alkenyl, or alkynyl group, for example. Aliphatic also refers to a chain or chain system excluding a ring or ring system having a conjugated pi electron system. The aliphatic group further includes a cycloalkyl, cylcoalkenyl, or cylcoalkynyl group. The aliphatic group may be a cyclohexylgroup.

The term "aromatic" used herein refers to an aromatic hydrocarbon group and an aromatic heteroatom-containing hydrocarbon group containing at least one ring and is a ring or ring system having a conjugated pi electron system, and includes a carbon-ring aromatic group (i.e. an aryl group, for example a phenyl group) and a heteroatom-containing ring aromatic group (i.e. a heteroaryl group, for example pyridine). When the entire ring system is an aromatic system, the term includes a monocyclic ring or a fused polycyclic ring (that is, a ring that shares adjacent pairs of atoms).

The term "aryl group" used herein refers to an aromatic ring, ring system (that is, two or more fused rings sharing two adjacent carbon atoms), or a ring in which a plurality of aromatic rings are connected to each other via a single bond, —O—, —S—, —C(=O)—, —S(=O)$_2$—, —Si(Ra)(Rb)— (wherein Ra and Rb are each independently a C1 to C10 alkyl group), a C1 to C10 alkylene group substituted or unsubstituted with halogen, or —C(=O)—NH—. When the aryl group is a ring system, each ring in such a system is aromatic. For example, the aryl group includes, but is not limited to, a phenyl group, a biphenyl group, a naphthyl group, a phenanthrenyl group, a naphthacenyl group, and the like. The aryl group may be unsubstituted or substituted.

The term "arylene group" used herein refers to an aryl group that requires two or more linkage points. A tetravalent-arylene group is an aryl group requiring 4 linkage points, a trivalent-arylene group is an aryl group requiring 3 linkage points, and a divalent-arylene group is an aryl group requiring 2 linkage points. For example, the arylene group may be, for example, —C$_6$H$_5$—O—C$_6$H$_5$—.

The "heteroaryl group" used herein refers to an aromatic ring system that has a single ring, a plurality of fused rings, or a ring in which a plurality of rings are connected to each other via a single bond, —O—, —S—, —C(=O)—, —S(=O)$_2$—, —Si(Ra)(Rb)— (wherein Ra and Rb are each independently a C1 to C10 alkyl group), a C1 to C10 alkylene group substituted or unsubstituted with halogen, or —C(=O)—NH—, and has at least one ring atom that is not carbon, but is instead a heteroatom, wherein the rest of the cyclic atoms are all carbon. In a fused ring system, at least one heteroatom may be present in only one ring. For example, a heteroatom includes oxygen, sulfur, and nitrogen, but is not limited thereto. For example, the heteroaryl group may be a furanyl group, a thienyl group, an imidazolyl group, a quinazolinyl group, a quinolinyl group, an isoquinolinyl group, a quinoxalinyl group, a pyridinyl group, a pyrrolyl group, an oxazolyl group, an indolyl group, and the like.

The term "heteroarylene group" used herein refers to a heteroaryl group that requires two or more linkage points. A tetravalent heteroarylene group is a heteroaryl group requiring four linkage points, a trivalent heteroarylene group is a heteroaryl groups requiring three linkage points, and a divalent heteroarylene group is a heteroaryl group requiring two linkage points.

As used herein, the term "heterocycloalkylene group" indicates a cycloalkylene group including at least one heteroatom such as N, S, P, or O that is substituted for at least one ring atom that is carbon. At least one hydrogen atom in the heterocycloalkylene group may be substituted with any of the substituents recited above that may be substituted in place of at least one hydrogen atom of the alkylene group.

The term "halogen" used herein refers to a stable element belonging to Group 17 of the Periodic Table of the Elements, and may be fluorine, chlorine, bromine or iodine, in particular, fluorine and/or chlorine. A "haloalkyl" group refers to an alkyl group substituted with at least one halogen atom, for example fluoroalkyl.

The weight average molecular weight (Mw) and number average molecular weight (Mn) of a polymer are measured by Gel Permeation Chromatography (GPC) on a polystyrene standard sample.

The present disclosure will be explained in more detail through the following Examples and Comparative Examples. However, Examples are provided herein for illustrative purpose and do not limit the scope of the one or more embodiments of the present disclosure.

EXAMPLES

Production of Organic Films

Example 1: TTT+4T+PFDA (Weight Ratio of 6:9:7.4)

740 mg of 2,2,3,3,4,4,5,5-octafluorohexane-1,6-diyldiacrylate (PFDA), 900 mg of pentaerythritol tetrakis(3-mercaptopropionate) (4T), 600 mg of 1,3,5-triallyl-1,3,5-triazine-2,4,6-trione (TTT), and 30 mg of IRGACURE 369 (BASF) represented by the following formula, which is used as a photoinitiator, were mixed and stirred to obtain a composition for forming an organic film.

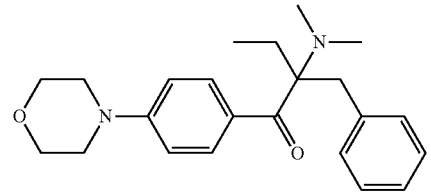

IRGACURE 369 (available from BASF)

The obtained composition was coated to a thickness of 100 μm on a petri dish (Φ=3.2 cm).

Ultraviolet (UV) light was generated by using a low pressure mercury lamp (0.08 W/cm$^2$) under nitrogen atmosphere for about 15 minutes to irradiate the composition and polymerize PFDA, TTT and 4T, thereby obtaining a crosslinked copolymer of the organic film layer. The average thickness of the organic film was 70 μm.

Example 2: TTT+4T+MT70 (Weight Ratio of 6:9:4)

An organic film was manufactured in the same manner as in Example 1, except that 400 mg of FOMBLIN MT70 (available from Solvay) was used instead of 740 mg of 2,2,3,3,4,4,5,5-octafluorohexane-1,6-diyldiacrylate (PFDA).

Example 3: TTT+4T+PFDE (Weight Ratio of 6:9:0.5)

An organic film was manufactured in the same manner as in Example 1, except that 50 mg of 2,2'-(3,3,4,4,5,5,6,6-decafluorohepane-1,7-diyl)bis(oxirane) was used instead of 740 mg of 2,2,3,3,4,4,5,5-octafluorohexane-1,6-diyldiacrylate (PFDA).

Comparative Example 1: TTT+4T (Weight Ratio of 6:9)

An organic film was manufactured in the same manner as in Example 1, except that 2,2,3,3,4,4,5,5-octafluorohexane-1,6-diyldiacrylate (PFDA) was not used.

Comparative Example 2: MT70

An organic film was manufactured in the same manner as in Example 1, except that 500 mg of FOMBLIN MT70 (Solvay) alone was used instead of 740 mg of 2,2,3,3,4,4,5,5-octafluorohexane-1,6-diyldiacrylate (PFDA), 900 mg of pentaerythritol tetrakis(3-mercaptopropionate (4T), and 600 mg of 1,3,5-triallyl-1,3,5-triazine-2,4,6-trione (TTT).

Manufacturing of Composite Membrane

Example 4: TTT+4T+PFDA (6:9:7.4)

A lithium-titanium-aluminum-phosphate (LTAP: $Li_{1.4}Ti_{1.6}Al_{0.4}P_3O_{12}$) film (available from Ohara Corporation) was ground, and then, the obtained result was sieved through a sieve having an average pore diameter of about 20 μm×25 μm to obtain LTAP particles having a size (average diameter) of 22 μm.

The LTAP particles were spread on an adhesive tape having an area of 5 cm²×5 cm² to affix the LTAP particles.

Separately, 740 mg of 2,2,3,3,4,4,5,5-octafluorohexane-1,6-diyldiacrylate (PFDA), 900 mg of pentaerythritol tetrakis(3-mercaptopropionate (4T), and 600 mg of 1,3,5-triallyl-1,3,5-triazine-2,4,6-trione (TTT) were dissolved in 6.6 ml of a mixed solvent including ethanol and chloroform (a mixed volumetric ratio of 1:1) to obtain a mixture. 30 mg of IRGACURE 369 (BASF) represented by the following formula, which is a photoinitiator, was added to the mixture, followed by stirring to obtain a polymerizable composition for forming an organic film layer.

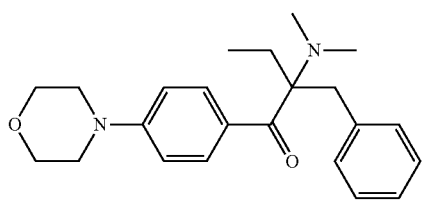

IRGACURE 369 (BASF)

6 ml of the polymerizable composition for forming the organic film layer obtained by the above process was spin-coated to a thickness of 15 μm on the LTAP particles fixed to the adhesive tape. Subsequently, ethanol and chloroform were then slowly evaporated for 1 hour.

Ultraviolet (UV) light was generated by using a low pressure mercury lamp (0.08 W/cm²) under nitrogen atmosphere for about 15 minutes to irradiate the resulting mixture and polymerize PFDA, TTT and 4T, thereby obtaining a composite membrane formed on an adhesive tape.

The adhesive tape with the composite membrane on its surface was submersed in a water bath and the adhesive tape was removed from the composite membrane.

The composite membrane included an organic film layer having a plurality of through holes and a plurality of LTAP particles present in the through holes. The amount of LTAP particles was, based on the total weight of 100 parts by weight of the composite membrane, 43 parts by weight. The average thickness of the composite membrane was 70 μm.

Example 5: TTT+4T+MT70 (6:9:4)

A composite membrane was manufactured in the same manner as in Example 4, except that 400 mg of FOMBLIN MT70 (Solvay) was used instead of 740 mg of 2,2,3,3,4,4,5,5-octafluorohexane-1,6-diyldiacrylate (PFDA).

Example 6: TTT+4T+PFDE (6:9:0.5)

A composite membrane was manufactured in the same manner as in Example 4, except that 50 mg of 2,2'-(3,3,4,4,5,5,6,6-decafluorohepane-1,7-diyl)bis(oxirane) was used instead of 740 mg of 2,2,3,3,4,4,5,5-octafluorohexane-1,6-diyldiacrylate (PFDA).

Comparative Example 3: TTT+4T (6:9)

A composite membrane was manufactured in the same manner as in Example 4, except that 2,2,3,3,4,4,5,5-octafluorohexane-1,6-diyldiacrylate (PFDA) was not used.

Comparative Example 4: MT70

A composite membrane was manufactured in the same manner as in Example 4, except that 500 mg of FOMBLIN MT70 (Solvay) alone was used instead of 740 mg of 2,2,3,3,4,4,5,5-octafluorohexane-1,6-diyldiacrylate (PFDA), 900 mg of pentaerythritol tetrakis(3-mercaptopropionate (4T), and 600 mg of 1,3,5-triallyl-1,3,5-triazine-2,4,6-trione (TTT).

Manufacturing of Lithium Air Battery

Example 7: Manufacture of Lithium Air Battery

Multi-walled carbon nanotubes (available from XinNano Inc.), N,N-diethyl-N-methyl-N-(2-methoxyethyl)ammonium bis(trifluoromethylsulfonyl)imide (DEME-TFSI) containing 1 molar (M) lithium bis(trifluoromethylsulfonyl imide) (LiTFSI), which is an ionic liquid, and polyvinylidene fluoride (PVDF) were mixed at a weight ratio of 5:25:1 to prepare a sheet-form cathode. The sheet-form cathode was cut to obtain a cathode in the form of a disk having a diameter of 8 mm.

For use as a cathode electrolyte, 1 M lithium bis(trifluoromethylsulfonyl imide)-containing N,N-diethyl-N-methyl-N-(2-methoxyethyl)ammonium bis(trifluoromethylsulfonyl)imide (DEME-TFSI) electrolyte was used.

A lithium metal (thickness: 500 μm) disc having a diameter of about 15 mm was used as an anode.

A polymer electrolyte disk was used as an anode electrolyte. 2 g of polyethylene oxide, 0.31 g of silica gel, and 0.26 g of LiTFSI were dissolved in 50 ml of acetonitrile, and mixed for 7 hours to obtain a polymer solution. The polymer solution was cast in a Teflon dish and dried to obtain a polymer electrolyte film having a thickness of about 190 μm. The resulting polymer film was punched to obtain a polymer electrolyte disk having a diameter of about 15 mm.

A copper thin film, the lithium metal disc, the polymer electrolyte disc, the composite membrane manufactured according to Example 4, the cathode electrolyte, the cathode, and a gas diffusion layer 35BA (SGL group) were assembled and sequentially stacked to manufacture a lithium air battery.

Examples 8 and 9: Manufacture of Lithium Air Batteries

Lithium air batteries were manufactured in the same manner as in Example 7, except that the composite membranes of Examples 5 and 6 were each used instead of the composite membrane of Example 4.

Comparative Examples 5 and 6: Manufacture of Lithium Air Batteries

Lithium air batteries were manufactured in the same manner as in Example 7, except that the composite membranes of Comparative Examples 3 and 4 were each used instead of the composite membrane of Example 4.

Evaluation Example 1: Measurement of Oxygen Permeability

The oxygen permeability of the organic films manufactured according to Examples 1 to 3 and Comparative Examples 1 and 2 were evaluated as follows.

The oxygen permeability and the moisture permeability were measured by using a continuous flow test method according to ASTM (D3985) using MOCON Aquatran model 1 and MOCON Oxytran 2/21 instruments, respectively (MOCON Inc.).

The sample disc had an area of about 1 cm$^2$, and was flushed with nitrogen gas and purged with excess gas to perform an oxygen and moisture permeation test. Part of the evaluation results are shown in Table 1 below.

TABLE 1

|  | Oxygen permeability [cm$^3$cm/m$^2$ day atm] |
|---|---|
| Example 1 | 0.2 |
| Example 2 | 1.1 |
| Example 3 | 0.03 |
| Comparative Example 1 | 0.7 |
| Comparative Example 2 | greater than 10,000 |

As shown in Table 1, the oxygen permeability of the organic films of Examples 1 to 3 were 1.1 cm$^3$ cm/m$^2$ day atm or less, and were similar to a TTT-4T organic film of Comparative Example 1, and were substantially less than the fluorine-containing organic film of Comparative Example 2.

The fluorine-containing organic film of Comparative Example 2 was substantially unable to block gas (oxygen).

Evaluation Example 2: Measurement of Mechanical Strength

The tensile strength and yield strain (i.e., strain at yield point) of each of the organic films manufactured according to Example 1 and Comparative Example 1 were measured by using Universal Test Machine (LLOYD LS100), and some of the results are shown in Table 2 below. The values of the tensile strength and yield strain were measured based on the standard of American Society for Testing and Materials (ASTM).

TABLE 2

|  | Tensile strength [MPa] | Yield strain [%] |
|---|---|---|
| Example 1 | 40 | 1.9 |
| Example 2 | 11 | 2.7 |
| Example 3 | 45 | 2.1 |
| Comparative Example 1 | 34 | 2.8 |
| Comparative Example 2 | 26 | 3.0 |

As shown in Table 2, the organic films of Examples 1 to 3 had a tensile strength of 10 MPa or greater, that is, a high mechanical strength, and a yield strain of 1% or greater, that is, good flexibility. The organic film of Example 2 may have high flexibility and may be foldable.

Evaluation Example 3: Swelling Ratio Measurement (Swelling Ratio, %)

The swelling ratio of the organic films manufactured according to Examples 1 to 3 and Comparative Examples 1 and 2 were evaluated as follows:

The organic films manufactured according to Examples 1 to 3 and Comparative Examples 1 to 2 were impregnated with two different electrolytes: (1) a liquid electrolyte prepared by dissolving 1 M LiTFSI in [N(Tf)$_2$] (1-ethyl-3-methylimidazolium bis(trifluoromethylsulfonyl)imide) (EMI) and (2) a liquid electrolyte prepared by dissolving 1 M LiTFSI in a propylene carbonate (PC) solvent. The impregnation was performed at a temperature of 80° C. for 24 hours, and then, the resulting films were pulled out of the liquid electrolytes and wiped the excess liquid electrolytes off the surfaces of the organic films. Then, the change in weight of the organic films before and after the impregnation was measured to evaluate the swelling ratio. The results are shown in Table 3. The swelling ratio is calculated according to Equation 1.

Swelling ratio (%)=[((weight of organic film after the impregnation)−(weight of organic film before the impregnation))/(weight of organic film before the impregnation)]×100%     Equation 1

TABLE 3

|  | Swelling ratio [%] | |
|---|---|---|
| Liquid Electrolyte | EMI/1M LiTFSI | PC/1M TFSI |
| Example 1 | +6% | +24% |
| Example 2 | +6% | +10% |
| Example 3 | +4% | +20% |
| Comparative Example 1 | +65% | +75% |
| Comparative Example 2 | +10% | +0% |

As shown in Table 3, the swelling ratio of each of the organic films of Examples 1 to 3 was 25% or less. That is, the organic films did not absorb an electrolyte. However, in the case of the TTT-4T organic film of Comparative Example 1, the swelling ratio was 75% or greater. That is, the organic film of Comparative Example 1 absorbed excess electrolyte.

Evaluation Example 4: Measurement of Charge/Discharge Stability

The charge/discharge stability of the composite membranes manufactured according to Examples 4 to 6 and Comparative Examples 3 and 4 were evaluated.

A coin cell in the form of a symmetric cell (Li|electrolyte|composite membrane|electrolyte|Li) in which a lithium metal disk was placed on opposite sides of the composite membrane disk was used. An electrolytic solution used herein was 0.3 M LiTFSI containing 1-ethyl-3-methylimidazolium bis(trifluoromethylsulfonyl)imide (EMI). A voltage change was observed while the coin cell was charged with a constant current (CC) of 0.24 milliamperes per square centimeter ($mA/cm^2$) for 5 hours, followed by a constant current (CC) discharge for 5 hours.

Evaluation results of the composite membranes of Example 4 and Comparative Example 3 are shown in FIG. 1.

As shown in FIG. 1, the coin cell including the composite membrane of Example 4 was stably operated during 5 hours of charging and 5 hours of discharging.

However, the comparative coin cell including the composite membrane of Comparative Example 3 was short-circuited after about 2.5 hours of charging.

Figure 2A:
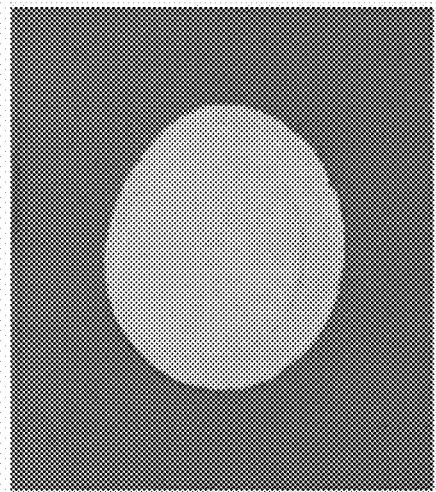
FIG. 2A is a scanning electron microscope (SEM) image of the composite membrane of Example 4 after the charging/discharging stability evaluation.
Figure 2B:
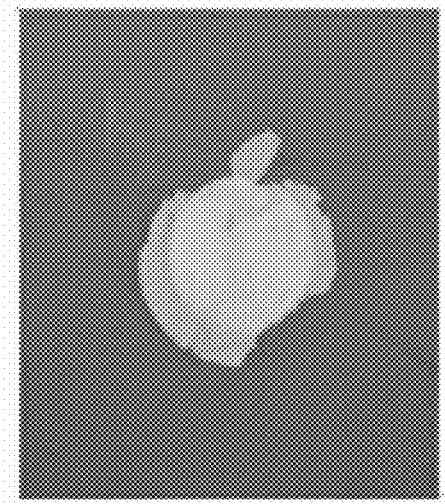
FIG. 2B is an SEM image of the composite membrane of Comparative Example 3 after the charging/discharging stability evaluation.

When the charging/discharging stability evaluation was finished, the composite membranes were each separated from the coin cells, and the shapes of the separated composite membranes are shown in FIGS. 2A and 2B.

As illustrated in FIG. 2A, the composite membrane of Example 4 retained its original disc shape.

On the other hand, as illustrated in FIG. 2B, the composite membrane of Comparative Example 3 lost its disc shape due to cracking.

Evaluation Example 5: Charging and Discharging Characteristics Evaluation of Lithium Air Battery The lithium air battery manufactured according to Example 7 and Comparative Example 5 were each placed in a chamber where the temperature was maintained at a temperature of about 60° C. in an oxygen atmosphere. The lithium air battery was, under 1 atm of oxygen, discharged in a 0.24 $mA/cm^2$ of constant current (CC) mode, and charged in a 4.3V of constant voltage (CV) mode.

Figure 3:
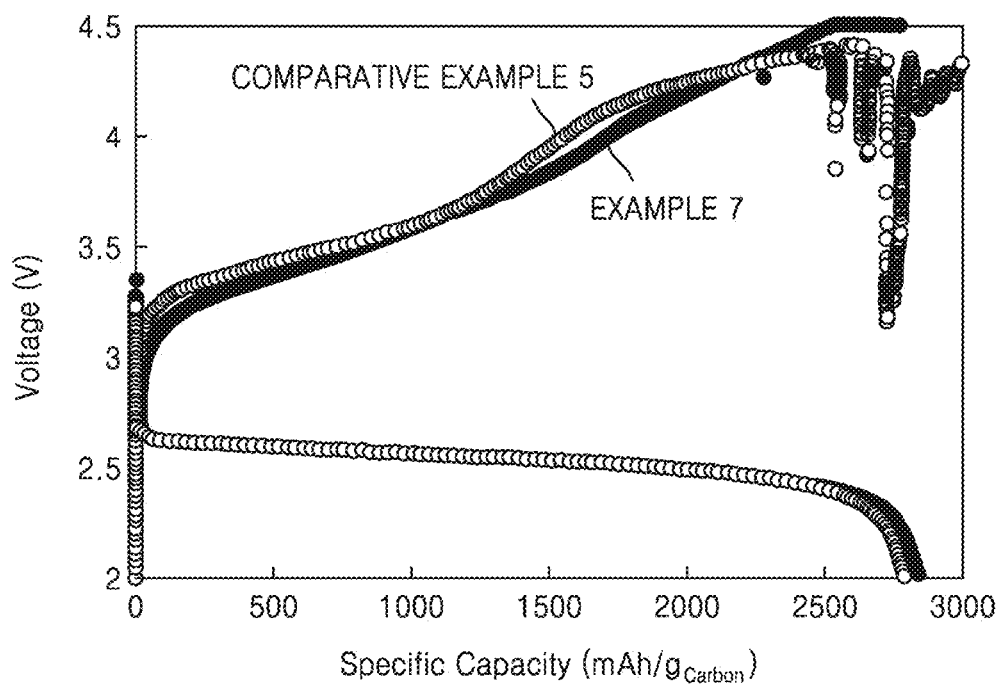
FIG. 3 is a graph of voltage (V) versus specific capacity (milliampere hours per gram of carbon, $mAh/g_{carbon}$) and shows charging/discharging profiles of lithium air batteries manufactured according to Example 7 and Comparative Example 5.

Charging and discharging characteristics of the lithium air battery are shown in FIG. 3.

As shown in FIG. 3, the lithium air battery manufactured according to Example 7 showed a stable charging/discharging profile, but the lithium air battery manufactured according to Comparative Example 5 was short-circuited during charging.

An aspect of the present disclosure provides a composite membrane that is excellent in ion conductivity, gas and moisture blocking characteristics, suppresses swelling with respect to an electrolyte swelling, and is lightweight and thin. When the composite membrane is used, the manufactured lithium battery has improved charging and discharging characteristics.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A composite membrane comprising
   an organic film layer; and
   a plurality of ion conductive inorganic particles disposed in the organic film layer,
   wherein the organic film layer comprises a crosslinked copolymer, and
   the crosslinked copolymer comprises a fluorine-containing first repeating unit and at least one repeating unit selected from a fluorine-free second repeating unit and a fluorine-free third repeating unit.

2. The composite membrane of claim 1, wherein the fluorine-containing first repeating unit is represented by one or more of Formulae 1 to 3:

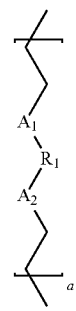

Formula 1

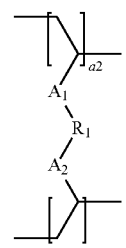

Formula 2

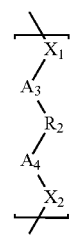

Formula 3 wherein, in Formulae 1 to 3,
$A_1$, $A_2$, $A_3$, and $A_4$ are each independently a covalent bond, —C(=O)—O—, —C(=O)—, or a C1 to C5 linear or branched alkylene group,
$R_1$ and $R_2$ are each independently a C1 to C10 linear or branched alkylene group; -($R_a$—O—)$_k$- wherein k is an integer from 2 to 100 and $R_a$ is a C2 to C10 alkylene group; a C6 to C10 cycloalkylene group; a C6 to C10 arylene group; or a C2 to C10 heteroarylene group, R$_1$ and R$_2$ are each substituted with at least one fluorine atom, X$_1$ and X$_2$ are each independently a covalent bond, —NH—C(=O)—, —CH$_2$CH(OH)—, —CF$_2$CF(OH)—, —O—, or —S—, and a1, a2, and b are each a mole fraction and satisfy the conditions of 0≤a1<1, 0<a2≤1, 0≤b<1, and 0<a1+a2+b<1.

3. The composite membrane of claim 1, wherein the fluorine-free second repeating unit is represented by one or more of Formulae 4 to 7:

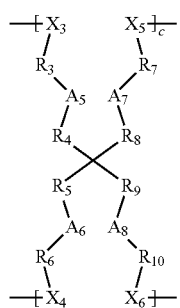

Formula 4

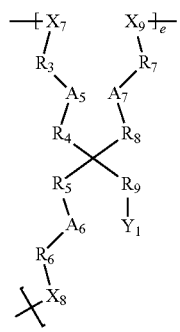

Formula 5

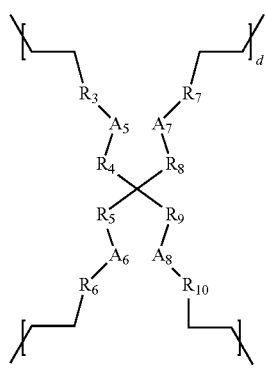

Formula 6

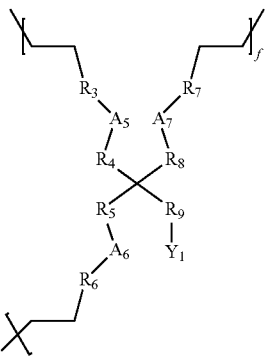

Formula 7 wherein, in Formulae 4 to 7,

A$_5$, A$_6$, A$_7$, and A$_8$ are each independently a covalent bond, —C(=O)—O—, —C(=O)—, or a C1 to C5 linear or branched alkylene group, R$_3$, R$_4$, R$_5$, R$_6$, R$_7$, R$_8$, R$_9$, and R$_{10}$ are each independently a C1 to C10 linear or branched alkylene group; -(—R$_a$—O—)$_k$- wherein k is an integer of 2 to 100 and R$_a$ is a C2 to C10 alkylene group; a C6 to C10 cycloalkylene group; a C6 to C10 arylene group; or a C2 to C10 heteroarylene group, Y$_1$ is a hydrogen atom, —OH, or —SH, X$_3$, X$_4$, X$_5$, X$_6$, X$_7$, X$_8$, and X$_9$ are each independently a covalent bond, —NH—C(=O)—, —CH$_2$CH(OH)—, —CF$_2$CF(OH)—, —O—, or —S—, and c, d, e, and f are each a mole fraction and satisfy the conditions of 0≤c<1, 0≤d<1, 0≤e<1, 0≤f<1, and 0<c+d+e+f<1.

4. The composite membrane of claim 1, wherein the fluorine-free third repeating unit is represented by one or more of Formulae 8 to 13:

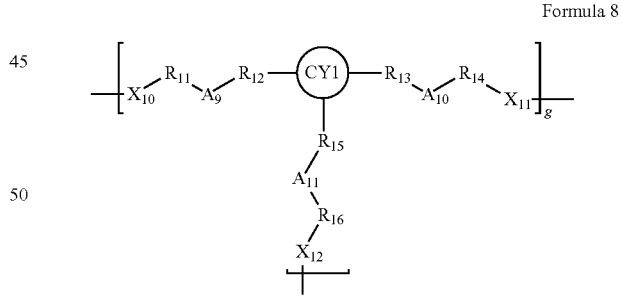

Formula 8

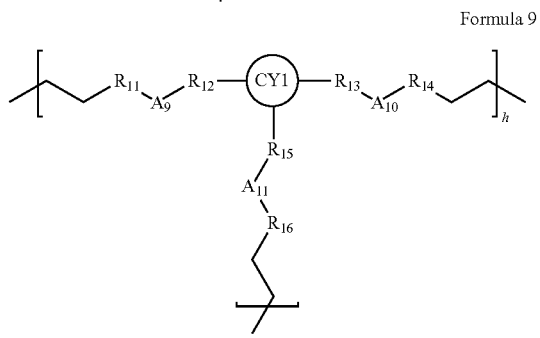

Formula 9

-continued

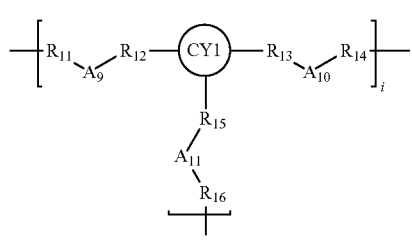
Formula 10

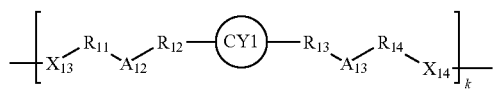
Formula 11

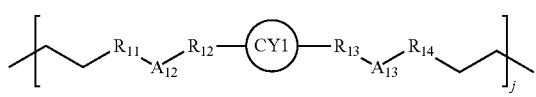
Formula 12

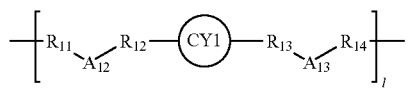
Formula 13 wherein, in Formulae 8 to 13, $A_9$, $A_{10}$, $A_{11}$, $A_{12}$, and $A_{13}$ are each independently a covalent bond, —O—, —C(=O)—O—, —C(=O)—, or a C1 to C5 linear or branched alkylene group, $R_{11}$, $R_{12}$, $R_{13}$, and $R_{14}$ are each independently a covalent bond, a C1 to C10 linear or branched alkylene group; -($-R_a-O-$)$_k$- wherein k is an integer of 2 to 100 and $R_a$ is a C2 to C10 alkylene group; a C6 to C10 cycloalkylene group; a C6 to C10 arylene group; or a C2 to C10 heteroarylene group, CY1 is a C2 to C20 heterocycloalkylene group substituted or unsubstituted; a C5 to C20 cycloalkylene group substituted or unsubstituted; a C6 to C20 arylene group substituted or unsubstituted; or a C2 to C20 heteroarylene group substituted or unsubstituted;

$X_{10}$, $X_{11}$, $X_{12}$, $X_{13}$, and $X_{14}$ are each independently be a covalent bond, —NH—C(=O)—, —CH$_2$CH(OH)—, —CF$_2$CF(OH)—, —O—, or —S—, and g, h, i, j, k, and L are each a mole fraction and satisfy the conditions of $0 \leq g < 1$, $0 \leq h < 1$, $0 \leq i < 1$, $0 \leq j < 1$, $0 \leq k < 1$, $0 \leq l < 1$, and $0 < g+h+i+j+k+l < 1$.

5. The composite membrane of claim 4, wherein CY1 in Formulae 11 to 13 is represented by one of Formulae 14 or 16, and CY1 in Formulae 8 to 10 is represented by one of Formulae 15 or 17:

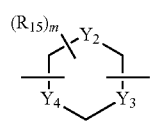
Formula 14

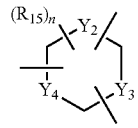
Formula 15

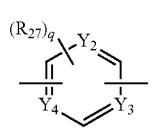
Formula 16

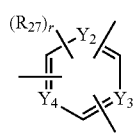
Formula 17 wherein, in Formulae 14 to 17, each $R_{15}$ is the same or different, and is independently a hydrogen atom or a C1 to C10 linear or branched alkyl group, each $R_{27}$ is the same or different, and is independently a hydrogen atom, or a C1 to C10 linear or branched alkyl group, and $Y_2$, $Y_3$, and $Y_4$ are each independently C, N, or P, with the proviso that when $Y_2$, $Y_3$, and $Y_4$ are each independently N or P, $Y_2$, $Y_3$, and $Y_4$ are not connected to $R_{15}$, $R_{27}$, or other linking group, m is 0 to 10, n is 0 to 9, q is 0 to 4, and r is 0 to 3.

6. The composite membrane of claim 1, wherein an amount of the fluorine-containing first repeating unit is, based on a total weight of the crosslinked copolymer, in a range of about 1 weight percent to about 50 weight percent, and a sum of an amount of the fluorine-free second repeating unit and an amount of the fluorine-free third repeating unit is, based on the total weight of the crosslinked copolymer, in a range of about 50 weight percent to about 99 weight percent.

7. The composite membrane of claim 1, wherein the crosslinked copolymer comprises a polymerization product of polymerizable fluoro-containing monomer and a polymerizable fluorine-free monomer, or a polymerization product of a polymerizable fluoro-containing monomer, a polymerizable fluorine-free monomer, and a polythiol compound comprising three or four thiol groups.

8. The composite membrane of claim 1, wherein the crosslinked copolymer comprises a polymerization product of at least one polyfunctional fluorine-free monomer selected from a polyfunctional acrylic monomer, a polyfunctional vinyl monomer, and a polyfunctional isocyanate monomer, and at least one polyfunctional fluoro-containing monomer selected from a polyfunctional fluoro-containing acrylic monomer, a polyfunctional fluoro-containing vinyl monomer, a polyfunctional fluoro-containing isocyanate monomer, and a polyfunctional fluoro-containing epoxide monomer, or a polymerization product of a polythiol compound comprising three or four thiol groups, at least one polyfunctional fluorine-free monomer selected from a polyfunctional acrylic monomer, a polyfunctional vinyl monomer, and a polyfunctional isocyanate monomer, and at least one polyfunctional fluoro-containing monomer selected from a polyfunctional fluoro-containing acrylic monomer, a polyfunctional fluoro-containing vinyl monomer, a polyfunctional fluoro-containing isocyanate monomer, and a polyfunctional fluoro-containing epoxide monomer.

9. The composite membrane of claim 8, wherein the polyfunctional fluoro-containing monomer is represented by one or more of Formulae 14 to 18:

Formula 14
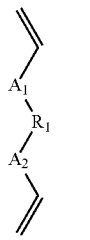

Formula 15
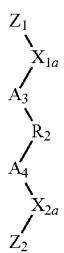

Formula 16
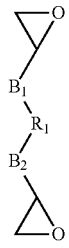

Formula 17
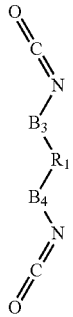

Formula 18
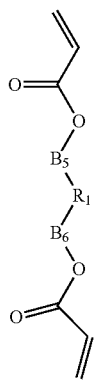

wherein, in Formulae 14 to 18, $A_1$, $A_2$, $A_3$, and $A_4$ are each independently a covalent bond, —C(=O)—O—, —C(=O)—, or a C1 to C5 linear or branched alkylene group, $B_1$, $B_2$, $B_3$, and $B_4$ are each independently a covalent bond or a C1 to C5 linear or branched alkylene group, $R_1$ and $R_2$ are each independently a C1 to C10 linear or branched alkylene group; -(—$R_a$—O—)$_k$— wherein k is an integer from 2 to 100 and $R_a$ is a C2 to C10 alkylene group a C6 to C10 cycloalkylene group; a C6 to C10 arylene group; or a C2 to C10 heteroarylene group, and $R_1$ and $R_2$ are each substituted with at least one fluorine atom, $X_{1a}$ and $X_{2a}$ are each independently —O— or —S—, and $Z_1$ and $Z_2$ are each independently a hydrogen atom, a C1 to C5 alkyl group, or a C1 to C5 fluoroalkyl group.

10. The composite membrane of claim 8, wherein
the polyfunctional fluorine-free monomer comprises at least one selected from diurethane dimethacrylate, trimethylolpropane triacrylate, diurethane diacrylate, trimethylolpropane trimethacrylate, neopentyl glycol diacrylate, 3'-acryloxy-2',2'-dimethylpropyl 3-acryloxy-2,2-dimethylpropionate, bisphenol A diacrylate, 1,3,5-triallyl-1,3,5-triazine-2,4,6-trione, 2,4,6-tris(allyloxy)-1,3,5-triazine, pentaerythrithol allyl ether, and isophorone diisocyanate,
the polythiol includes at least one selected from tris(2-(3-mercaptopropionyloxy)ethyl) isocyanurate, pentaerythritol tetrakis(3-mercaptopropionate), trimethylolpropane tris(3-mercaptopropionate), 4-mercaptomethyl-3,6-dithia-1,8-octanedithiol, pentaerythritol tetrakis(2-mercaptoacetate), and trimethylolpropane tris (2-mercaptoacetate), and
the polyfunctional fluoro-containing monomer includes at least one selected from 2,2,3,3,4,4,5,5-octafluorohexane-1,6-diyldiacrylate, (2,2,3,3,4,4,5,5,6,6-decafluoroheptane-1,7-diyl)bis(oxirane), and a methacryloyl group-containing fluoropolyether.

11. The composite membrane of claim 1, wherein the organic film layer has moisture blocking characteristics and gas blocking characteristics.

12. The composite membrane of claim 1, wherein gas permeability of the organic film layer is about $10^{-3}$ to about 2,000 cubic centimeters per centimeter per meter squared per day per atmosphere.

13. The composite membrane of claim 1, wherein the organic film layer is a flexible film layer that is foldable.

14. The composite membrane of claim 1, wherein the organic film layer has a tensile strength of 10 megapascals or greater, and a yield strain of 1% or greater.

15. The composite membrane of claim 1, wherein the organic film layer has a swelling ratio of 30% or less after being impregnated with an electrolytic solution at a temperature of 80° C. for 24 hours.

16. The composite membrane of claim 1, wherein the organic film layer comprises a plurality of through holes, and the plurality of ion conductive inorganic particles are disposed inside the plurality of through holes.

17. The composite membrane of claim 1, wherein the composite membrane comprises a surface having a sea-island structure, wherein the plurality of ion conductive inorganic particles are discontinuously disposed in the organic film layer wherein the organic film is continuous, or wherein the composite membrane has a cross section having a structure wherein the organic film layer and the plurality of ion conductive inorganic particles are alternately aligned.

18. The composite membrane of claim 1, wherein the plurality of ion conductive inorganic particles disposed in the organic film layer are disposed in the form of a monolayer.

19. The composite membrane of claim 1, wherein each ion conductive inorganic particle of the plurality of ion conductive inorganic particles is single-body particle without grain boundaries.

20. The composite membrane of claim 1, wherein an amount of the plurality of ion conductive inorganic particles, based on 100 parts by weight of a total weight of the composite membrane, is in a range of about 10 parts by weight to about 90 parts by weight.

21. The composite membrane of claim 1, wherein the plurality of ion conductive inorganic particles include one or more selected from a glassy active metal ion conductor, an amorphous active metal ion conductor, a ceramic active metal ion conductor, and a glass-ceramic active metal ion conductor, or a combination thereof.

22. The composite membrane of claim 1, wherein the plurality of ion conductive inorganic particles include one or more selected from $Li_{1+x+y}Al_xTi_{2-x}Si_yP_{3-y}O_{12}$ wherein $0<x<2$ and $0\leq y<3$, $BaTiO_3$, $Pb(Zr_xTi_{(1-x)})O_3$ wherein $0\leq x\leq 1$, $Pb_{1-x}La_xZr_{1-y}Ti_yO_3$ wherein $0\leq x<1$, $0\leq y<1$, $Pb(Mg_3Nb_{2/3})O_3$—$PbTiO_3$, $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, $Li_3PO_4$, $Li_xTi_y(PO_4)_3$ wherein $0<x<2$, $0<y<3$, $Li_xAl_yTi_z(PO_4)_3$ wherein $0<x<2$, $0<y<1$, and $0<z<3$, $Li_{1+x+y}(Al_aGa_{(1-a)})_x(Ti_bGe_{(1-b)})_{2-x}Si_yP_{3-y}O_{12}$ wherein $0\leq x\leq 1$, $0\leq y\leq 1$, $0\leq a\leq 1$, and $0\leq b\leq 1$, $Li_xLa_yTiO_3$ wherein $0<x<2$ and $0<y<3$, $Li_xGe_yP_zS_w$ wherein $0<x<4$, $0<y<1$, $0<z<1$, and $0<w<5$, $Li_xN_y$ wherein $0<x<4$, $0<y<2$, $Li_xSi_yS_z$ wherein $0<x<3$, $0<y<2$, and $0<z<4$, $Li_xP_yS_z$ wherein $0<x<3$, $0<y<3$, and $0<z<7$, $Li_2O$, $LiF$, $LiOH$, $Li_2CO_3$, $LiAlO_2$, $Li_2O$—$Al_2O_3$—$SiO_2$—$P_2O_5$—$TiO_2$—$GeO_2$, and $Li_{3+x}La_3M_2O_{12}$ wherein M is at least one of Te, Nb, or Zr, and x is an integer from 1 to 10.

23. The composite membrane of claim 1, wherein an average diameter of the ion conductive inorganic particles is in a range of about 1 micrometer to about 300 micrometers.

24. The composite membrane of claim 1, wherein the composite membrane has a gas permeability of $10^{-3}$ cubic centimeters per centimeter per meter squared per day per atmosphere to 2,000 cubic centimeters per centimeter per meter squared per day per atmosphere, and
an exposure surface area of the plurality of ion conductive inorganic particles of the composite membrane is, based on a total surface area of the composite membrane, in a range of about 30% to about 80%.

25. An anode structure comprising:
an anode; and
the composite membrane of claim 1.

26. A lithium battery comprising the anode structure of claim 25.

27. The lithium battery of claim 26, wherein the lithium battery is a lithium metal battery or a lithium air battery.

28. A method of manufacturing a composite membrane, the method comprising:
placing a plurality of ion conductive inorganic particles on a substrate;
disposing, among the plurality of ion conductive inorganic particles, a mixture comprising a polymerizable composition and a solvent;
removing the solvent from the mixture; and
polymerizing the polymerizable composition to form the composite membrane comprising an organic film layer and a plurality of ion conductive inorganic particles disposed in the organic film layer,
wherein the polymerizable composition comprises a polymerizable fluoro-containing monomer and a polymerizable fluorine-free monomer, and
the organic film layer comprises a crosslinked copolymer.

29. The method of claim 28, wherein the substrate is an adhesive substrate.

30. The method of claim 28, wherein the disposing of the mixture is performed by spin coating.

31. The method of claim 28, wherein the polymerizable composition comprises one or more polyfunctional fluoro-containing monomers represented by one or more of Formulae 14 to 18:

Formula 14

Formula 15

Formula 16

Formula 17

-continued

Formula 18

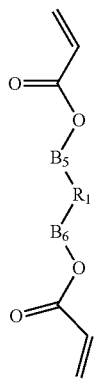

wherein, in Formulae 14 to 18,

A$_1$, A$_2$, A$_3$, and A$_4$ are each independently a covalent bond, —C(=O)—O—, —C(=O)—, or a C1 to C5 linear or branched alkylene group, B$_1$, B$_2$, B$_3$, and B$_4$ are each independently a covalent bond or a C1 to C5 linear or branched alkylene group, R$_1$ and R$_2$ are each independently a C1 to C10 linear or branched alkylene group; -(—R$_a$—O—)$_k$- wherein k is an integer from 2 to 100 and R$_a$ is a C2 to C10 alkylene group; a C6 to C10 cycloalkylene group; a C6 to C10 arylene group; or a C2 to C10 heteroarylene group, and each of R$_1$ and R$_2$ comprises at least one fluorine atom, X$_{1a}$ and X$_{2a}$ are each independently —O— or —S—, and Z$_1$ and Z$_2$ are each independently a hydrogen atom, a C1 to C5 alkyl group, or a C1 to C5 fluoroalkyl group.

32. The method of claim 28, wherein the removing of the solvent is performed at a temperature of about 25° C. to about 60° C.

33. The method of claim 28, wherein an amount of the polymerizable composition placed on the substrate, based on 100 parts by weight of the plurality of ion conductive inorganic particles, is in the range of about 10 parts by weight to about 1,000 parts by weight.

* * * * *